US011937072B2

(12) United States Patent
Murata et al.

(10) Patent No.: US 11,937,072 B2
(45) Date of Patent: Mar. 19, 2024

(54) HEADPHONES, OUT-OF-HEAD LOCALIZATION FILTER DETERMINATION DEVICE, OUT-OF-HEAD LOCALIZATION FILTER DETERMINATION SYSTEM, OUT-OF-HEAD LOCALIZATION FILTER DETERMINATION METHOD, AND PROGRAM

(71) Applicant: JVCKENWOOD Corporation, Yokohama (JP)

(72) Inventors: Hisako Murata, Yokohama (JP); Yumi Fujii, Yokohama (JP); Toshiaki Nagai, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 185 days.

(21) Appl. No.: 17/672,604

(22) Filed: Feb. 15, 2022

(65) Prior Publication Data

US 2022/0174448 A1 Jun. 2, 2022

Related U.S. Application Data

(63) Continuation of application No. PCT/JP2020/034150, filed on Sep. 9, 2020.

(30) Foreign Application Priority Data

Sep. 24, 2019 (JP) ................................ 2019-173014
Sep. 24, 2019 (JP) ................................ 2019-173015

(51) Int. Cl.
*H04S 7/00* (2006.01)
*H04R 1/10* (2006.01)

(52) U.S. Cl.
CPC .......... *H04S 7/304* (2013.01); *H04R 1/1008* (2013.01)

(58) Field of Classification Search
None
See application file for complete search history.

(56) References Cited

U.S. PATENT DOCUMENTS 5,761,314 A 6/1998 Inanaga et al.
10,206,053 B1 2/2019 Welti
(Continued)

FOREIGN PATENT DOCUMENTS

JP H08-111899 A 4/1996
JP 3637596 B 4/2005
(Continued)

*Primary Examiner* — Kenny H Truong
(74) *Attorney, Agent, or Firm* — Procopio, Cory, Hargreaves & Savitch LLP

(57) ABSTRACT

An out-of-head localization filter determination system according to an embodiment includes headphones, a microphone unit, a measurement processor, and a server device. The measurement processor measures first ear canal transfer characteristics from a first position to a microphone, measures ear canal transfer characteristics from a second position to a microphone, and transmits user data related to the first ear canal transfer characteristics to the server device. The server device includes a storage unit that stores first preset data and a second preset data in association with each other, a comparison unit that compares the second preset data with the user data, and an extraction unit that extracts the first preset data according to a comparison result.

4 Claims, 25 Drawing Sheets

200

(56) References Cited

U.S. PATENT DOCUMENTS

| | | | | |
|---|---|---|---|---|
| 2013/0177166 | A1 | 7/2013 | Agevik et al. | |
| 2015/0280677 | A1 | 10/2015 | Hui | |
| 2017/0332186 | A1 * | 11/2017 | Riggs | H04S 3/008 |
| 2020/0068337 | A1 | 2/2020 | Murata et al. | |

FOREIGN PATENT DOCUMENTS

| | | | |
|---|---|---|---|
| JP | 2005150954 | A | 6/2005 |
| JP | 2018191208 | A | 11/2018 |

* cited by examiner

| ID OF PERSON BEING MEASURED | LEFT/ RIGHT | FIRST EAR CANAL TRANSFER CHARACTERISTICS | SPATIAL ACOUSTIC TRANSFER CHARACTERISTICS 1 | SPATIAL ACOUSTIC TRANSFER CHARACTERISTICS 2 |
|---|---|---|---|---|
| ID_A | L | F_ECTFL_A | Hls_A | Hro_A |
| ID_A | R | F_ECTFR_A | Hrs_A | Hlo_A |
| ID_B | L | F_ECTFL_B | Hls_B | Hro_B |
| ID_B | R | F_ECTFR_B | Hrs_B | Hlo_B |
| : | : | : | : | : |

Fig. 7

| ID OF PERSON BEING MEASURED | LEFT/ RIGHT | FIRST EAR CANAL TRANSFER CHARACTERISTICS | SECOND EAR CANAL TRANSFER CHARACTERISTICS | SPATIAL ACOUSTIC TRANSFER CHARACTERISTICS 1 | SPATIAL ACOUSTIC TRANSFER CHARACTERISTICS 2 |
|---|---|---|---|---|---|
| ID_A | L | F_ECTFL_A | M_ECTFL_A | Hls_A | Hro_A |
| ID_A | R | F_ECTFR_A | M_ECTFR_A | Hrs_A | Hlo_A |
| ID_B | L | F_ECTFL_B | M_ECTFL_B | Hls_B | Hro_B |
| ID_B | R | F_ECTFR_B | M_ECTFR_B | Hrs_B | Hlo_B |
| : | : | : | : | : | : |

Fig. 8

| ID OF PERSON BEING MEASURED | LEFT/RIGHT | SECOND EAR CANAL TRANSFER CHARACTERISTICS | THIRD EAR CANAL TRANSFER CHARACTERISTICS | SPATIAL ACOUSTIC TRANSFER CHARACTERISTICS 3 | SPATIAL ACOUSTIC TRANSFER CHARACTERISTICS 4 |
|---|---|---|---|---|---|
| ID_A | L | M_ECTFL_A | B_ECTFL_A | SHls_A | SHro_A |
| ID_A | R | M_ECTFR_A | B_ECTFR_A | SHrs_A | SHlo_A |
| ID_B | L | M_ECTFL_B | B_ECTFL_B | SHls_B | SHro_B |
| ID_B | R | M_ECTFR_B | B_ECTFR_B | SHrs_B | SHlo_B |
| . . | . . | . . | . . | . . | . . |

Fig. 10

| ID OF PERSON BEING MEASURED | LEFT/RIGHT | FIRST EAR CANAL TRANSFER CHARACTERISTICS | SECOND EAR CANAL TRANSFER CHARACTERISTICS | THIRD EAR CANAL TRANSFER CHARACTERISTICS | SPATIAL ACOUSTIC TRANSFER CHARACTERISTICS 1 | SPATIAL ACOUSTIC TRANSFER CHARACTERISTICS 2 |
|---|---|---|---|---|---|---|
| ID_A | L | F_ECTFL_A | M_ECTFL_A | B_ECTFL_A | Hls_A | Hro_A |
| ID_A | R | F_ECTFR_A | M_ECTFR_A | B_ECTFR_A | Hrs_A | Hlo_A |
| ID_B | L | F_ECTFL_B | M_ECTFL_B | B_ECTFL_B | Hls_B | Hro_B |
| ID_B | R | F_ECTFR_B | M_ECTFR_B | B_ECTFR_B | Hrs_B | Hlo_B |
| : | : | : | : | : | : | : |

Fig. 11

| ID OF PERSON BEING MEASURED | LEFT/ RIGHT | FIRST EAR CANAL TRANSFER CHARACTERISTICS | SPATIAL ACOUSTIC TRANSFER CHARACTERISTICS 1 | SPATIAL ACOUSTIC TRANSFER CHARACTERISTICS 2 | SHAPE DATA |
|---|---|---|---|---|---|
| ID_A | L | F_ECTFL_A | Hls_A | Hlo_A | DIML_A |
| ID_A | R | F_ECTFR_A | Hrs_A | Hro_A | DIMR_A |
| ID_B | L | F_ECTFL_B | Hls_B | Hlo_B | DIML_B |
| ID_B | R | F_ECTFR_B | Hrs_B | Hro_B | DIMR_B |
| : | : | : | : | : | : |

Fig. 20

HEADPHONES, OUT-OF-HEAD LOCALIZATION FILTER DETERMINATION DEVICE, OUT-OF-HEAD LOCALIZATION FILTER DETERMINATION SYSTEM, OUT-OF-HEAD LOCALIZATION FILTER DETERMINATION METHOD, AND PROGRAM

CROSS REFERENCE TO RELATED APPLICATION

This application is based upon and claims the benefit of priority from Japanese patent application No. 2019-173014 filed on Sep. 24, 2019 and Japanese patent application No. 2019-173015 filed on Sep. 24, 2019 the disclosure of which is incorporated herein in its entirety by reference.

BACKGROUND

The present invention relates to headphones, an out-of-head localization filter determination device, an out-of-head localization filter determination system, an out-of-head localization filter determination method, and a program.

Sound localization techniques include an out-of-head localization technique, which localizes sound images outside the head of a listener by using headphones. The out-of-head localization technique localizes sound images outside the head by canceling characteristics from the headphones to the ears and giving four characteristics from stereo speakers to the ears.

In out-of-head localization reproduction, measurement signals (impulse sounds etc.) that are output from 2-channel (which is referred to hereinafter as "ch") speakers are recorded by microphones (which can be also called "mike") placed on the listener's (the user's) ears. Then, a processing device generates a filter based on a sound pickup signal obtained by impulse response. The generated filter is convolved to 2-ch audio signals, thereby implementing out-of-head localization reproduction.

In addition, to generate a filter to cancel headphone-to-ear characteristics, characteristics from the headphones to a vicinity of the ear or the eardrum (also referred to as ear canal transfer function ECTF, or ear canal transfer characteristics) are measured with a microphone installed in the listener's ear.

Patent Literature 1 (Japanese Unexamined Patent Application Publication No. H8-111899) discloses a binaural listening device using an out-of-head sound localization filter. This device transforms spatial transfer functions of a large number of persons measured in advance into feature parameter vectors corresponding to human auditory characteristics. The device then performs clustering and uses data aggregated into small clusters. The device further performs clustering of the spatial transfer functions measured in advance and real-ear headphone inverse transfer functions by human physical dimensions. It then uses data of a person that is nearest to the center of mass of each cluster.

Patent Literature 2 (Japanese Unexamined Patent Application Publication No. 2018-191208) discloses an out-of-head localization filter determination device including headphones and a microphone unit. In Patent Literature 1, the server device stores first preset data related to spatial acoustic transfer characteristics from a sound source to ears of persons being measured and second preset data related to car canal transfer characteristics of the cars of the persons being measured, in association with each other. A user terminal measures measurement data related to the ear canal transfer characteristics of the user. The user terminal transmits user data based on the measurement data to the server device. The server device compares the user data with a plurality of second preset data. The server device extracts a part of the first preset data based on the comparison result.

SUMMARY

In such out-of-head localization processing, it is preferable to use an appropriate filter. Therefore, it is preferable to perform appropriate measurement.

The present disclosure has been accomplished to solve the above problems and an object of the present invention is thus to provide headphones, an out-of-head localization filter determination device, out-of-head localization filter determination system, an out-of-head localization filter determination method, and a program, capable of determining an appropriate filter.

An out-of-head localization filter determination system according to an embodiment is an out-of-head localization filter determination system, including: an output unit configured to be worn on a user and output sounds to an ear of the user; a microphone unit, including a microphone, configured to be worn on the ear of the user, the microphone picking up sounds output from the output unit; a measurement processor configured to output a measurement signal to the output unit and acquire a sound pickup signal output from the microphone unit, and thereby measure ear canal transfer characteristics; and a server device configured to be able to communicate with the measurement processor, wherein the measurement processor: measures first ear canal transfer characteristics from a first position to the microphone with a driver of the output unit being at the first position; measures a second ear canal transfer characteristics from a second position, different from the first position, to the microphone; and transmits user data related to the first and second car canal transfer characteristics to the server device, and the server device includes: a data storage unit configured to store first preset data related to spatial acoustic transfer characteristics from a sound source to an ear of a person being measured and second preset data related to car canal transfer characteristics of the ear of the person being measured in association with each other, and store a plurality of the first and second preset data acquired for a plurality of persons being measured; a comparison unit configured to compare the user data with the plurality of second preset data; and an extraction unit configured to extract first preset data from the plurality of first preset data based on a comparison result in the comparison unit.

An out-of-head localization filter determination method according to an embodiment is an out-of-head localization filter determination method for determining an out-of-head localization filter for the user by using: an output unit configured to be worn on a user and output sounds to an ear of the user; and a microphone unit, including a microphone, configured to be worn on the car of the user, the microphone picking up sounds output from the output unit, the out-of-head localization filter determination method including: a step of measuring first car canal transfer characteristics from a first position to the microphone and second ear canal transfer characteristics from a second position to the microphone; a step of acquiring user data based on measurement data related to the first and second ear canal transfer characteristics; a step of storing a plurality of first and second preset data acquired for a plurality of persons being measured, in such a way that associates the first preset data related to spatial acoustic transfer characteristics from a sound source to ears of persons being measured and the second preset data related to ear canal transfer characteristics of the ears of the persons being measured; and a step of comparing the user data with the plurality of second preset data and thereby extracting first preset data from the plurality of first preset data.

A program according to an embodiment is a program for causing a computer to execute an out-of-head localization filter determination method for determining an out-of-head localization filter for a user by using: an output unit configured to be worn on a user and output sounds to an ear of the user; and a microphone unit, including a microphone, configured to be worn on the ear of the user, the microphone picking up sounds output from the output unit, the out-of-head localization filter determination method including: a step of measuring first ear canal transfer characteristics from a first position to the microphone and second ear canal transfer characteristics from a second position to the microphone; a step of acquiring user data based on measurement data related to the first ear canal transfer characteristics; a step of storing a plurality of first and second preset data acquired for a plurality of persons being measured, in such a way that associates the first preset data related to spatial acoustic transfer characteristics from a sound source to ears of persons being measured and the second preset data related to ear canal transfer characteristics of the ears of the persons being measured; and a step of comparing the user data with the plurality of second preset data and thereby extracting first preset data from the plurality of first preset data.

Headphones according to an embodiment are headphones including: a headphone band; a left housing and a right housing each provided on the headphone band; guide mechanisms provided on the left and right housings; drivers placed in the left and right housings; and actuators configured to move the drivers along the guide mechanisms.

Headphones according to an embodiment are headphones including: a headphone band; a left inner housing and a right inner housing each fixed to the headphone band; a plurality of drivers fixed to the left and right inner housings; and outer housings, placed outside the left and right inner housings, each configured to have a variable angle with respect to each of the inner housings.

According to the embodiment, it is possible to provide headphones, an out-of-head localization filter determination device, an out-of-head localization filter determination system, an out-of-head localization filter determination method, and a program, capable of determining an appropriate filter.

BRIEF DESCRIPTION OF THE DRAWINGS

FIG. 7 is a table showing the data structure of preset data stored in the server device.

FIG. 8 is a table showing the data structure of preset data in a modified example 1.

FIG. 10 is a table showing the data structure of preset data according to the second embodiment.

FIG. 11 is a table showing the data structure of preset data.

FIG. 20 is a table showing preset data when shape data is used.

DETAILED DESCRIPTION (Overview)

Figure 1:
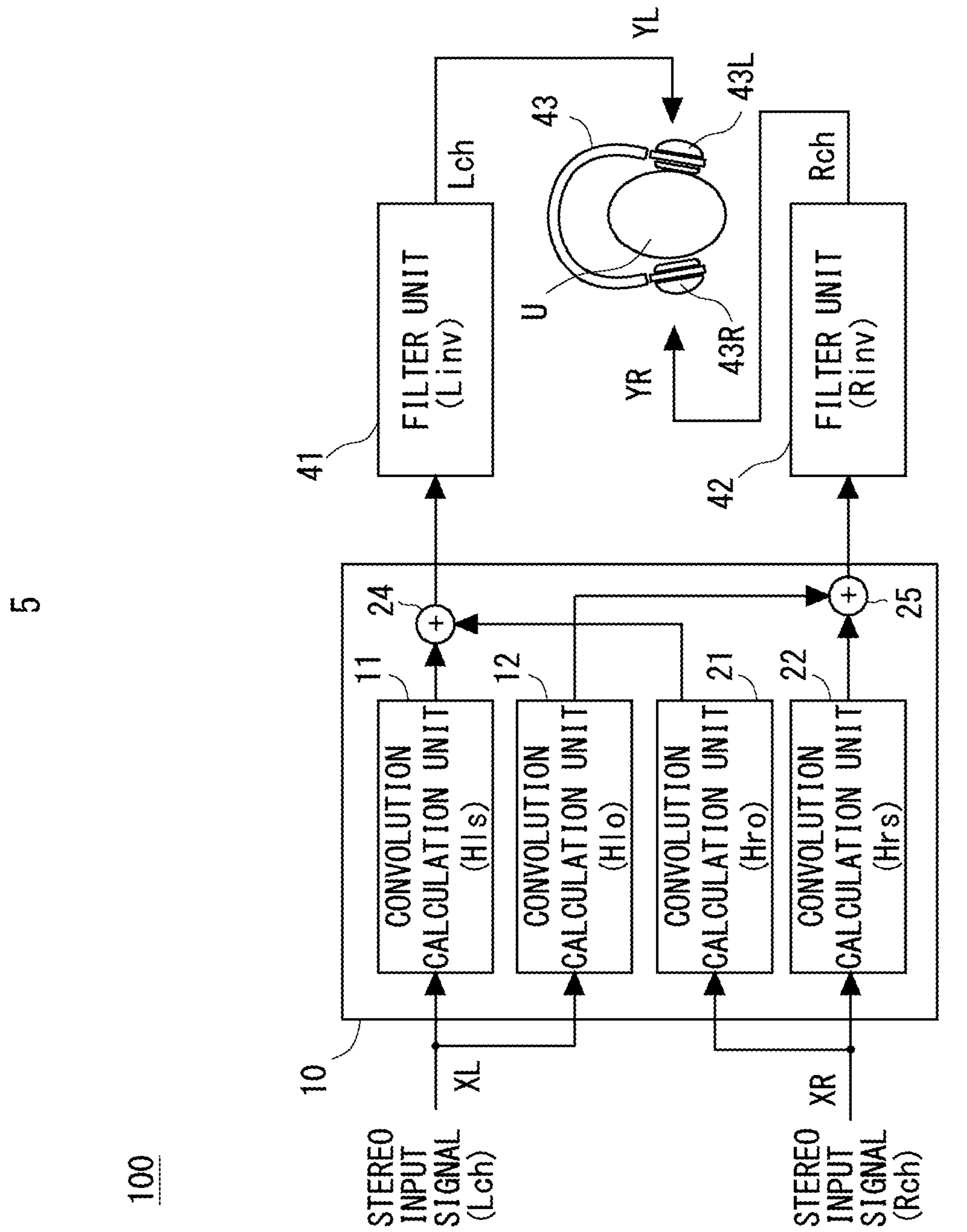
FIG. 1 is a block diagram showing an out-of-head localization processing device according to an embodiment.

The overview of sound localization processing is described hereinafter. Out-of-head localization, which is an example of a sound localization processing device, is described in the following example. The out-of-head localization processing according to this embodiment performs out-of-head localization by using spatial acoustic transfer characteristics and ear canal transfer characteristics. The spatial acoustic transfer characteristics are transfer characteristics from a sound source such as speakers to an ear canal. The ear canal transfer characteristics are transfer characteristics from the entrance of the ear canal to the eardrum. In this embodiment, out-of-head localization is implemented by measuring the ear canal transfer characteristics when headphones are worn and using this measurement data.

Out-of-head localization according to this embodiment is performed by a user terminal such as a personal computer (PC), a smart phone, or a tablet terminal. The user terminal is an information processor including a processing means such as a processor, a storage means such as a memory or a hard disk, a display means such as a liquid crystal monitor, and an input means such as a touch panel, a button, a keyboard and a mouse. The user terminal has a communication function to transmit and receive data. Further, an output means (output unit) with headphones or earphones is connected to the user terminal.

To obtain high localization effect, it is preferable to measure the characteristics of a user and generate an out-of-head localization filter. The spatial acoustic transfer characteristics of an individual user are generally measured in a listening room where acoustic devices such as speakers and room acoustic characteristics are in good condition. Thus, a user needs to go to a listening room or install a listening room in a user's home or the like. Therefore, there are cases where the spatial acoustic transfer characteristics of an individual user cannot be measured appropriately.

Further, even when a listening room is installed by placing speakers in a user's home or the like, there are cases where the speakers are placed in an asymmetric position or the acoustic environment of the room is not appropriate for listening to music. In such cases, it is extremely difficult to measure appropriate spatial acoustic transfer characteristics at home.

On the other hand, measurement of the ear canal transfer characteristics of an individual user is performed with a microphone unit and headphones being worn. In other words, the ear canal transfer characteristics can be measured as long as a user is wearing a microphone unit and headphones. Thus, a user does not need to go to a listening room or install a large-scale listening room in a user's home. Further, generation of measurement signals for measuring the ear canal transfer characteristics, recording of sound pickup signals and the like can be done using a user terminal such as a smart phone or a PC.

As described above, there are cases where it is difficult to carry out measurement of the spatial acoustic transfer characteristics on an individual user. In view of the above, an out-of-head localization system according to this embodiment determines a filter in accordance with the spatial acoustic transfer characteristics based on measurement results of the ear canal transfer characteristics. Specifically, this system determines an out-of-head localization filter suitable for a user based on measurement results of the ear canal transfer characteristics of an individual user.

To be specific, an out-of-head localization system includes a user terminal and a server device. The server device stores the spatial acoustic transfer characteristics and the ear canal transfer characteristics measured in advance on a plurality of persons being measured other than a user. Specifically, measurement of the spatial acoustic transfer characteristics using speakers as a sound source (which is hereinafter referred to also as first pre-measurement) and measurement of the ear canal transfer characteristics using headphones as another sound source (which is hereinafter referred to also as second pre-measurement) are performed by using a measurement device different from a user terminal. The first pre-measurement and the second pre-measurement are performed on persons being measured other than a user.

The server device stores first preset data in accordance with results of the first pre-measurement and second preset data in accordance with results of the second pre-measurement. As a result of performing the first and second pre-measurement on a plurality of persons being measured, a plurality of first preset data and a plurality of second preset data are acquired. The server device then stores the first preset data related to the spatial acoustic transfer characteristics and the second preset data related to the ear canal transfer characteristics in association with each person being measured. The server device stores a plurality of first preset data and a plurality of second preset data in a database.

Further, for an individual user on which out-of-head localization is to be performed, only the ear canal transfer characteristics are measured by using a user terminal (which is described hereinafter as user measurement). The user measurement is measurement using headphones as a sound source, just like the second pre-measurement. The user terminal acquires measurement data related to the ear canal transfer characteristics. The user terminal then transmits user data based on the measurement data to the server device. The server device compares the user data with the plurality of second preset data. Based on a comparison result, the server device determines second preset data having a strong correlation to the user data from the plurality of second preset data.

Then, the server device reads the first preset data associated with the second preset data having a strong correlation. In other words, the server device extracts the first preset data suitable for an individual user from the plurality of first preset data based on a comparison result. The server device transmits the extracted first preset data to the user terminal. Then, the user terminal performs out-of-head localization based on a filter based on the first preset data and an inverse filter based on the user measurement.

First Embodiment (Out-of-Head Localization Processing Device)

FIG. 1 shows an out-of-head localization processing device 100, which is an example of a sound field reproduction device according to this embodiment. FIG. 1 is a block diagram of the out-of-head localization processing device 100. The out-of-head localization processing device 100 reproduces sound fields for a user U who is wearing headphones 43. Thus, the out-of-head localization processing device 100 performs sound localization processing for L-ch and R-ch stereo input signals XL and XR. The L-ch and R-ch stereo input signals XL and XR are analog audio reproduced signals that are output from a CD (Compact Disc) player or the like or digital audio data such as mp3 (MPEG Audio Layer-3). Note that the out-of-head localization processing device 100 is not limited to a physically single device, and a part of processing may be performed in a different device. For example, a part of processing may be performed by a PC or the like, and the rest of processing may be performed by a DSP (Digital Signal Processor) included in the headphones 43 or the like.

The out-of-head localization processing device 100 includes an out-of-head localization unit 10, a filter unit 41, a filter unit 42, and headphones 43. The out-of-head localization unit 10, the filter unit 41 and the filter unit 42 constitute an arithmetic processing unit 120, which is described later, and they can be implemented by a processor or the like, to be specific.

The out-of-head localization unit 10 includes convolution calculation units 11 to 12 and 21 to 22, and adders 24 and 25. The convolution calculation units 11 to 12 and 21 to 22 perform convolution processing using the spatial acoustic transfer characteristics. The stereo input signals XL and XR from a CD player or the like are input to the out-of-head localization unit 10. The spatial acoustic transfer characteristics are set to the out-of-head localization unit 10. The out-of-head localization unit 10 convolves a filter of the spatial acoustic transfer characteristics (which is hereinafter referred to also as a spatial acoustic filter) into each of the stereo input signals XL and XR. The spatial acoustic transfer characteristics may be a head-related transfer function HRTF measured in the head or auricle of a person being measured, or may be the head-related transfer function of a dummy head or a third person.

The spatial acoustic transfer function is a set of four spatial acoustic transfer characteristics Hls, Hlo, Hro and Hrs. Data used for convolution in the convolution calculation units 11 to 12 and 21 to 22 is a spatial acoustic filter. Each of the spatial acoustic transfer characteristics Hls, Hlo, Hro and Hrs is measured using a measurement device, which is described later.

The convolution calculation unit 11 convolves the spatial acoustic filter in accordance with the spatial acoustic transfer characteristics His to the L-ch stereo input signal XL. The convolution calculation unit 11 outputs convolution calculation data to the adder 24. The convolution calculation unit 21 convolves the spatial acoustic filter in accordance with the spatial acoustic transfer characteristics Hro to the R-ch stereo input signal XR. The convolution calculation unit 21 outputs convolution calculation data to the adder 24. The adder 24 adds the two convolution calculation data and outputs the data to the filter unit 41.

The convolution calculation unit 12 convolves the spatial acoustic filter in accordance with the spatial acoustic transfer characteristics Hlo to the L-ch stereo input signal XL. The convolution calculation unit 12 outputs convolution calculation data to the adder 25. The convolution calculation unit 22 convolves the spatial acoustic filter in accordance with the spatial acoustic transfer characteristics Hrs to the R-ch stereo input signal XR. The convolution calculation unit 22 outputs convolution calculation data to the adder 25. The adder 25 adds the two convolution calculation data and outputs the data to the filter unit 42.

An inverse filter that cancels out the headphone characteristics (characteristics between a reproduction unit of headphones and a microphone) is set to the filter units 41 and 42. Then, the inverse filter is convolved to the reproduced signals (convolution calculation signals) on which processing in the out-of-head localization unit 10 has been performed. The filter unit 41 convolves the inverse filter to the L-ch signal from the adder 24. Likewise, the filter unit 42 convolves the inverse filter to the R-ch signal from the adder 25. The inverse filter cancels out the characteristics from the headphone unit to the microphone when the headphones 43 are worn. The microphone may be placed at any position between the entrance of the ear canal and the eardrum. The inverse filter is calculated from a result of measuring the characteristics of the user U.

The filter unit 41 outputs the processed L-ch signal to a left unit 43L of the headphones 43. The filter unit 42 outputs the processed R-ch signal to a right unit 43R of the headphones 43. The user U is wearing the headphones 43. The headphones 43 output the L-ch signal and the R-ch signal toward the user U. It is thereby possible to reproduce sound images localized outside the head of the user U.

As described above, the out-of-head localization processing device 100 performs out-of-head localization by using the spatial acoustic filters in accordance with the spatial acoustic transfer characteristics Hls, Hlo, Hro and Hrs and the inverse filters of the headphone characteristics. In the following description, the spatial acoustic filters in accordance with the spatial acoustic transfer characteristics Hls, Hlo, Hro and Hrs and the inverse filter of the headphone characteristics are referred to collectively as an out-of-head localization filter. In the case of 2ch stereo reproduced signals, the out-of-head localization filter is composed of four spatial acoustic filters and two inverse filters. The out-of-head localization processing device 100 then carries out convolution calculation on the stereo reproduced signals by using the total six out-of-head localization filters and thereby performs out-of-head localization.

(Measurement Device of Spatial Acoustic Transfer Characteristics)

Figure 2:
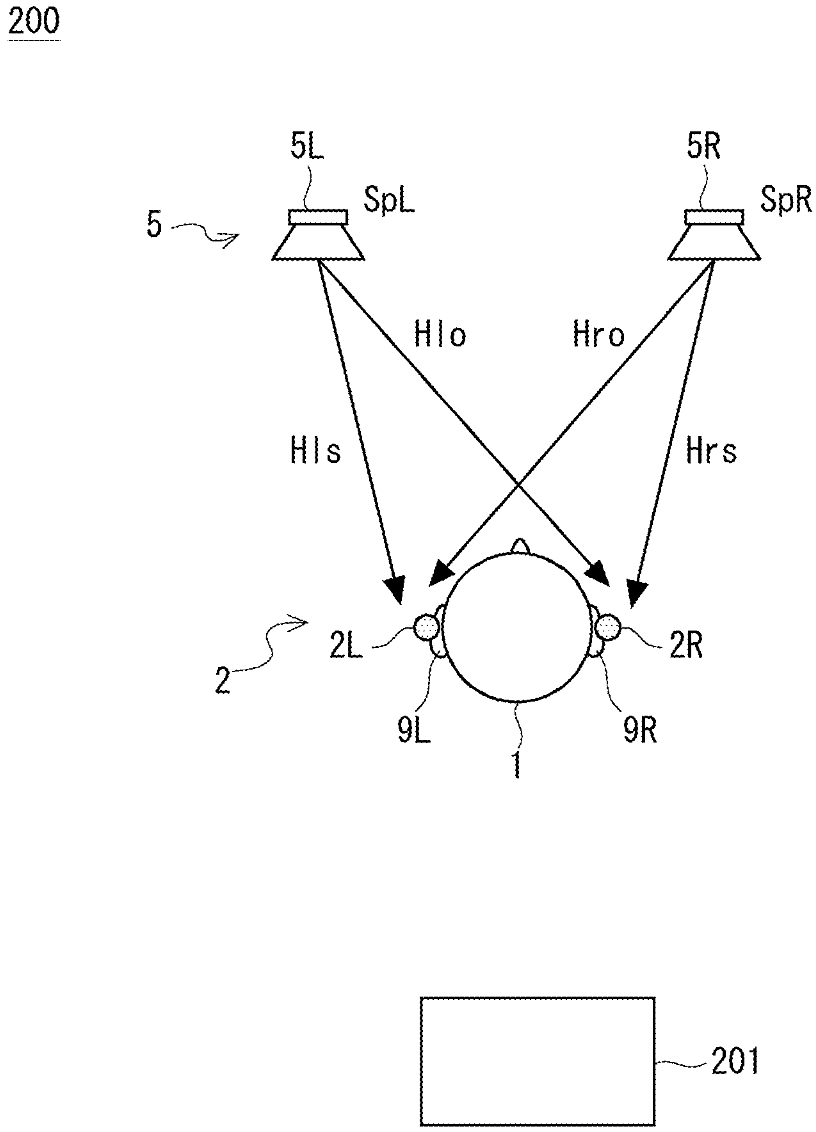
FIG. 2 is a view showing the structure of a measurement device for measuring spatial acoustic transfer characteristics.

A measurement device 200 for measuring the spatial acoustic transfer characteristics Hls, Hlo, Hro and Hrs is described hereinafter with reference to FIG. 2. FIG. 2 is a view schematically showing a measurement structure for performing the first pre-measurement on a person 1 being measured.

As shown in FIG. 2, the measurement device 200 includes a stereo speaker 5 and a microphone unit 2. The stereo speaker 5 is placed in a measurement environment. The measurement environment may be the user U's room at home, a dealer or showroom of an audio system or the like. The measurement environment is preferably a listening room where speakers and acoustics are in good condition.

In this embodiment, a measurement processor 201 of the measurement device 200 performs processing for appropriately generating the spatial acoustic filter. The measurement processor 201 includes a music player such as a CD player, for example. The measurement processor 201 may be a personal computer (PC), a tablet terminal, a smart phone or the like. Further, the measurement processor 201 may be a server device.

The stereo speaker 5 includes a left speaker 5L and a right speaker 5R. For example, the left speaker 5L and the right speaker 5R are placed in front of the person 1 being measured. The left speaker 51 and the right speaker 5R output impulse sounds for impulse response measurement and the like. Although the number of speakers, which serve as sound sources, is 2 (stereo speakers) in this embodiment, the number of sound sources to be used for measurement is not limited to 2, and it may be 1 or more. Therefore, this embodiment is applicable also to 1ch mono or 5.1ch, 7.1ch etc. multichannel environment.

The microphone unit 2 is stereo microphones including a left microphone 2L and a right microphone 2R. The left microphone 2L is placed on a left ear 9L of the person 1 being measured, and the right microphone 2R is placed on a right ear 9R of the person 1 being measured. To be specific, the microphones 2L and 2R are preferably placed at a position between the entrance of the ear canal and the eardrum of the left ear 9L and the right ear 9R, respectively. The microphones 2L and 2R pick up measurement signals output from the stereo speaker 5 and acquire sound pickup signals. The microphones 2L and 2R output the sound pickup signal to the measurement processor 201. The person 1 being measured may be a person or a dummy head. In other words, in this embodiment, the person 1 being measured is a concept that includes not only a person but also a dummy head.

As described above, impulse sounds output from the left speaker 5L and right speaker 5R are measured using the microphones 2L and 2R, respectively, and thereby impulse response is measured. The measurement processor 201 stores the sound pickup signals acquired by the impulse response measurement into a memory or the like. The spatial acoustic transfer characteristics His between the left speaker 5L and the left microphone 2L, the spatial acoustic transfer characteristics Hlo between the left speaker 5L and the right microphone 2R, the spatial acoustic transfer characteristics Hro between the right speaker 5R and the left microphone 2L, and the spatial acoustic transfer characteristics Hrs between the right speaker 5R and the right microphone 2R are thereby measured. Specifically, the left microphone 2L picks up the measurement signal that is output from the left speaker 5L, and thereby the spatial acoustic transfer characteristics His are acquired. The right microphone 2R picks up the measurement signal that is output from the left speaker 5L, and thereby the spatial acoustic transfer characteristics Hlo are acquired. The left microphone 2L picks up the measurement signal that is output from the right speaker 5R, and thereby the spatial acoustic transfer characteristics Hro are acquired. The right microphone 2R picks up the measurement signal that is output from the right speaker 5R, and thereby the spatial acoustic transfer characteristics Hrs are acquired.

Further, the measurement device 200 may generate the spatial acoustic filters in accordance with the spatial acoustic transfer characteristics His, Hlo, Hro and Hrs from the left and right speakers 5L and 5R to the left and right microphones 2L and 2R based on the sound pickup signals. For example, the measurement processor 201 cuts out the spatial acoustic transfer characteristics Hls, Hlo, Hro and Hrs with a specified filter length. The measurement processor 201 may correct the measured spatial acoustic transfer characteristics Hls, Hlo, Hro and Hrs.

In this manner, the measurement processor 201 generates the spatial acoustic filter to be used for convolution calculation of the out-of-head localization processing device 100. As shown in FIG. 1, the out-of-head localization processing device 100 performs out-of-head localization by using the spatial acoustic filters in accordance with the spatial acoustic transfer characteristics Hls, Hlo, Hro and Hrs between the left and right speakers 5L and 5R and the left and right microphones 2L and 2R. Specifically, the out-of-head localization is performed by convolving the spatial acoustic filters to the audio reproduced signals.

The measurement processor 201 performs the same processing on the sound pickup signal corresponding to each of the spatial acoustic transfer characteristics Hls, Hlo, Hro and Hrs. Specifically, the same processing is performed on each of the four sound pickup signals corresponding to the spatial acoustic transfer characteristics Hls, Hlo, Hro and Hrs. The spatial acoustic filters respectively corresponding to the spatial acoustic transfer characteristics Hls, Hlo, Hro and Hrs are thereby generated.

(Measurement of Ear Canal Transfer Characteristics)

Figure 3:
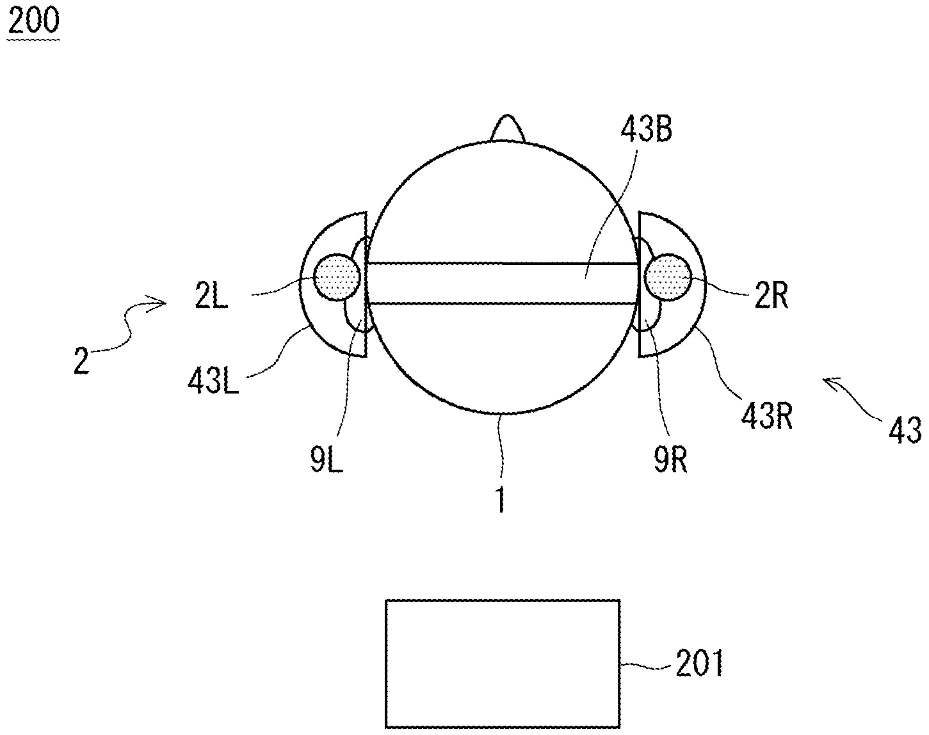
FIG. 3 is a view showing the structure of a measurement device for measuring ear canal transfer characteristics.

A measurement device 200 for measuring the ear canal transfer characteristics is described hereinafter with reference to FIG. 3. FIG. 3 shows a structure for performing the second pre-measurement on a person 1 being measured.

A microphone unit 2 and headphones 43 are connected to a measurement processor 201. The microphone unit 2 includes a left microphone 2L and a right microphone 2R. The left microphone 2L is worn on a left ear 9L of the person 1 being measured, and the right microphone 2R is worn on a right ear 9R of the person 1 being measured. The measurement processor 201 and the microphone unit 2 may be the same as or different from the measurement processor 201 and the microphone unit 2 in FIG. 2, respectively.

The headphones 43 include a headphone band 43B, a left unit 43L, and a right unit 43R. The headphone band 43B connects the left unit 43L and the right unit 43R. The left unit 43L outputs a sound toward the left ear 9L of the person 1 being measured. The right unit 43R outputs a sound toward the right ear 9R of the person 1 being measured. The type of the headphones 43 may be closed, open, semi-open, semi-closed or any other type. The headphones 43 are worn on the person 1 being measured while the microphone unit 2 is worn on this person. Specifically, the left unit 43L and the right unit 43R of the headphones 43 are worn on the left ear 9L and the right ear 9R on which the left microphone 21 and the right microphone 2R are worn, respectively. The headphone band 43B generates an urging force to press the left unit 43L and the right unit 43R against the left ear 91 and the right ear 9R, respectively.

The left microphone 2L picks up the sound output from the left unit 43L of the headphones 43. The right microphone 2R picks up the sound output from the right unit 43R of the headphones 43. A microphone part of each of the left microphone 2L and the right microphone 2R is placed at a sound pickup position near the external acoustic opening. The left microphone 2L and the right microphone 2R are formed not to interfere with the headphones 43. Specifically, the person 1 being measured can wear the headphones 43 in the state where the left microphone 2L and the right microphone 2R are placed at appropriate positions of the left ear 9L and the right ear 9R, respectively. Note that the left microphone 21L and the right microphone 2R may be built in the left unit 43L and the right unit 43R of the headphones 43, respectively, or they may be provided separately from the headphones 43.

The measurement processor 201 outputs measurement signals to the left microphone 2L and the right microphone 2R. The left microphone 2L and the right microphone 2R thereby generate impulse sounds or the like. To be specific, an impulse sound output from the left unit 43L is measured by the left microphone 2L. An impulse sound output from the right unit 43R is measured by the right microphone 2R. Impulse response measurement is performed in this manner.

The measurement processor 201 stores the sound pickup signals acquired based on the impulse response measurement into a memory or the like. The transfer characteristics between the left unit 43L and the left microphone 2L (which is the ear canal transfer characteristics of the left ear) and the transfer characteristics between the right unit 43R and the right microphone 2R (which is the ear canal transfer characteristics of the right ear) are thereby acquired. Measurement data of the ear canal transfer characteristics of the left ear acquired by the left microphone 2L is referred to as measurement data ECTFL, and measurement data of the ear canal transfer characteristics of the right ear acquired by the right microphone 2R is referred to as measurement data ECTFR.

The measurement processor 201 has a memory for storing measurement data ECTFL and ECTFR, respectively. Note that the measurement processor 201 generates an impulse signal, a TSP (Time Stretched Pule) signal or the like as the measurement signal for measuring the ear canal transfer characteristics and the spatial acoustic transfer characteristics. The measurement signal contains a measurement sound such as an impulse sound.

By the measurement devices 200 shown in FIGS. 2 and 3, the ear canal transfer characteristics and the spatial acoustic transfer characteristics of a plurality of persons 1 being measured are measured. In this embodiment, the first pre-measurement by the measurement structure in FIG. 2 is performed on a plurality of persons 1 being measured. Likewise, the second pre-measurement by the measurement structure in FIG. 3 is performed on the plurality of persons 1 being measured. The ear canal transfer characteristics and the spatial acoustic transfer characteristics are thereby measured for each of the persons 1 being measured.

(Out-of-Head Localization Filter Determination System)

Figure 4:
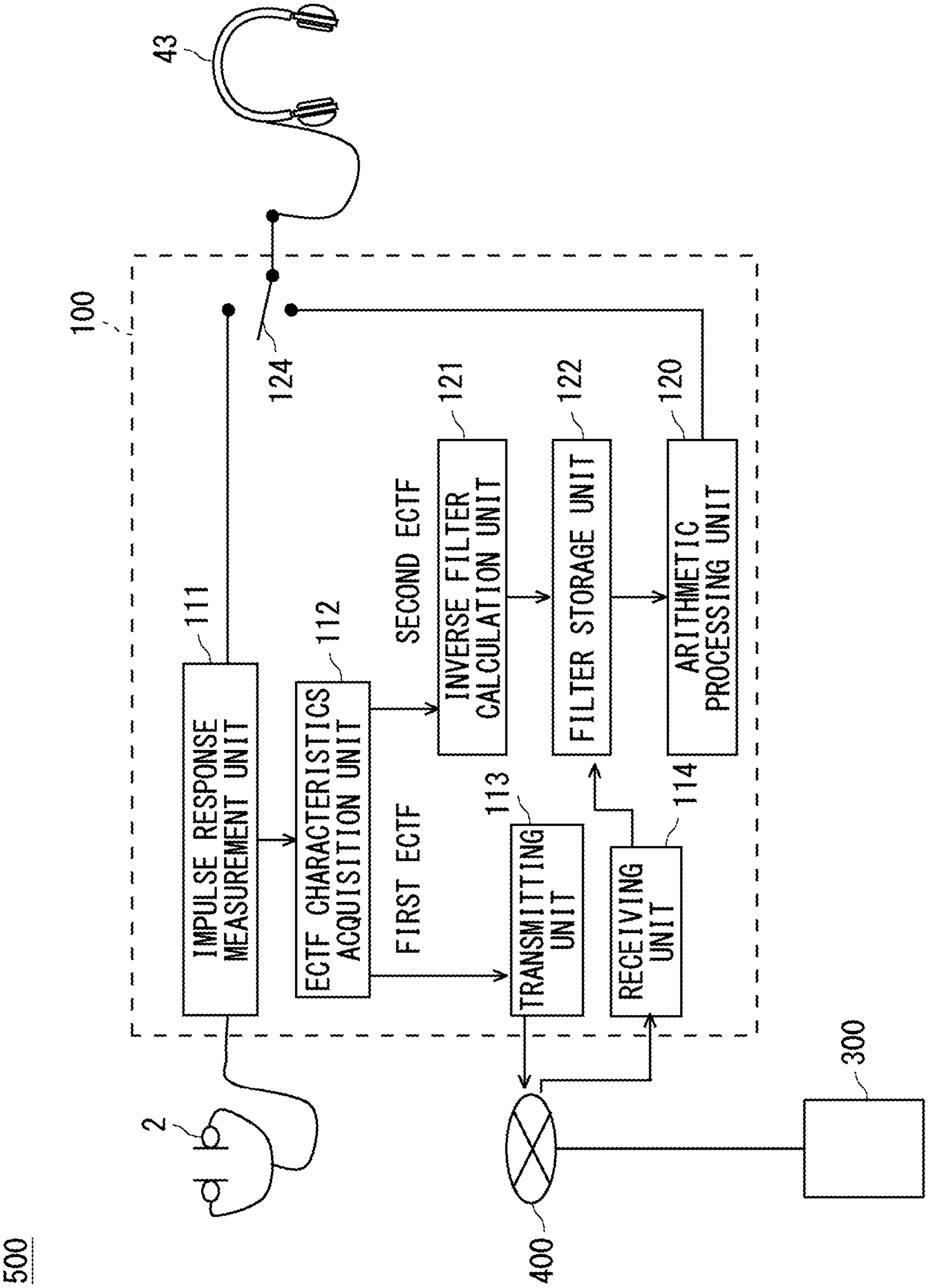
FIG. 4 is a view showing the overall structure of an out-of-head localization filter determination system according to this embodiment.

An out-of-head localization filter determination system 500 according to this embodiment is described hereinafter with reference to FIG. 4. FIG. 4 is a view showing the overall structure of the out-of-head localization filter determination system 500. The out-of-head localization filter determination system 500 includes a microphone unit 2, headphones 43, an out-of-head localization processing device 100, and a server device 300.

The out-of-head localization processing device 100 and the server device 300 are connected through a network 400. The network 400 is a public network such as the Internet or a mobile phone communication network, for example. The out-of-head localization processing device 100 and the server device 300 can communicate with each other by wireless or wired. Note that the out-of-head localization processing device 100 and the server device 300 may be an integral device.

The out-of-head localization processing device 100 is a user terminal that outputs a reproduced signal on which out-of-head localization has been performed to a user U, as shown in FIG. 1. Further, the out-of-head localization processing device 100 performs measurement of the ear canal transfer characteristics of the user U. The microphone unit 2 and the headphones 43 are connected to the out-of-head localization processing device 100. The out-of-head localization processing device 100 performs impulse response measurement using the microphone unit 2 and the headphones 43, just like the measurement device 200 in FIG. 3. Note that the out-of-head localization processing device 100 may be connected to the microphone unit 2 and the headphones 43 wirelessly by Bluetooth (registered trademark) or the like.

The out-of-head localization processing device 100 includes an impulse response measurement unit Ill, an ECTF characteristics acquisition unit 112, a transmitting unit 113, a receiving unit 114, an arithmetic processing unit 120, an inverse filter calculation unit 121, a filter storage unit 122, and a switch 124. Note that, when the out-of-head localization processing device 100 and the server device 300 are an integral device, this device may include an acquisition unit that acquires user data, instead of the receiving unit 114.

The switch 124 switches user measurement and out-of-head localization reproduction. Specifically, for user measurement, the switch 124 connects the headphones 43 to the impulse response measurement unit 111. For out-of-head localization reproduction, the switch 124 connects the headphones 43 to the arithmetic processing unit 120.

The impulse response measurement unit Ill outputs a measurement signal, which is an impulse sound, to the headphones 43 in order to perform user measurement. The microphone unit 2 picks up the impulse sound output from the headphones 43. The microphone unit 2 outputs the sound pickup signal to the impulse response measurement unit 111. The impulse response measurement is the same as described with reference to FIG. 3, and the description thereof is omitted as appropriate. In other words, the out-of-head localization processing device 100 has the same functions as the measurement processor 201 in FIG. 3. The impulse response measurement unit 111, which serves as a measurement device for the out-of-head localization processing device 100, the microphone unit 2 and the headphones 43 to perform user measurement, may perform A/D conversion, synchronous addition and the like of the sound pickup signals.

By the impulse response measurement, the impulse response measurement unit 111 acquires the measurement data ECTF related to the ear canal transfer characteristics. The measurement data ECTF contains measurement data ECTFL related to the ear canal transfer characteristics of the left ear 9L of the user U and the measurement data ECTFR related to the ear canal transfer characteristics of the right ear 9R of the user U.

The ECTF characteristics acquisition unit 112 performs specified processing on the measurement data ECTFL and ECTFR and thereby acquires the characteristics of the measurement data ECTFL and ECTFR. For example, the ECTF characteristics acquisition unit 112 calculates frequency-amplitude characteristics and frequency-phase characteristics by performing discrete Fourier transform. Further, the ECTF characteristics acquisition unit 112 may calculate the frequency-amplitude characteristics and the frequency-phase characteristics not only by the discrete Fourier transform but also by means for converting the discrete signal into the frequency domain such as the discrete cosine transform. Instead of the frequency-amplitude characteristics, frequency-power characteristics may be used.

Figure 5:
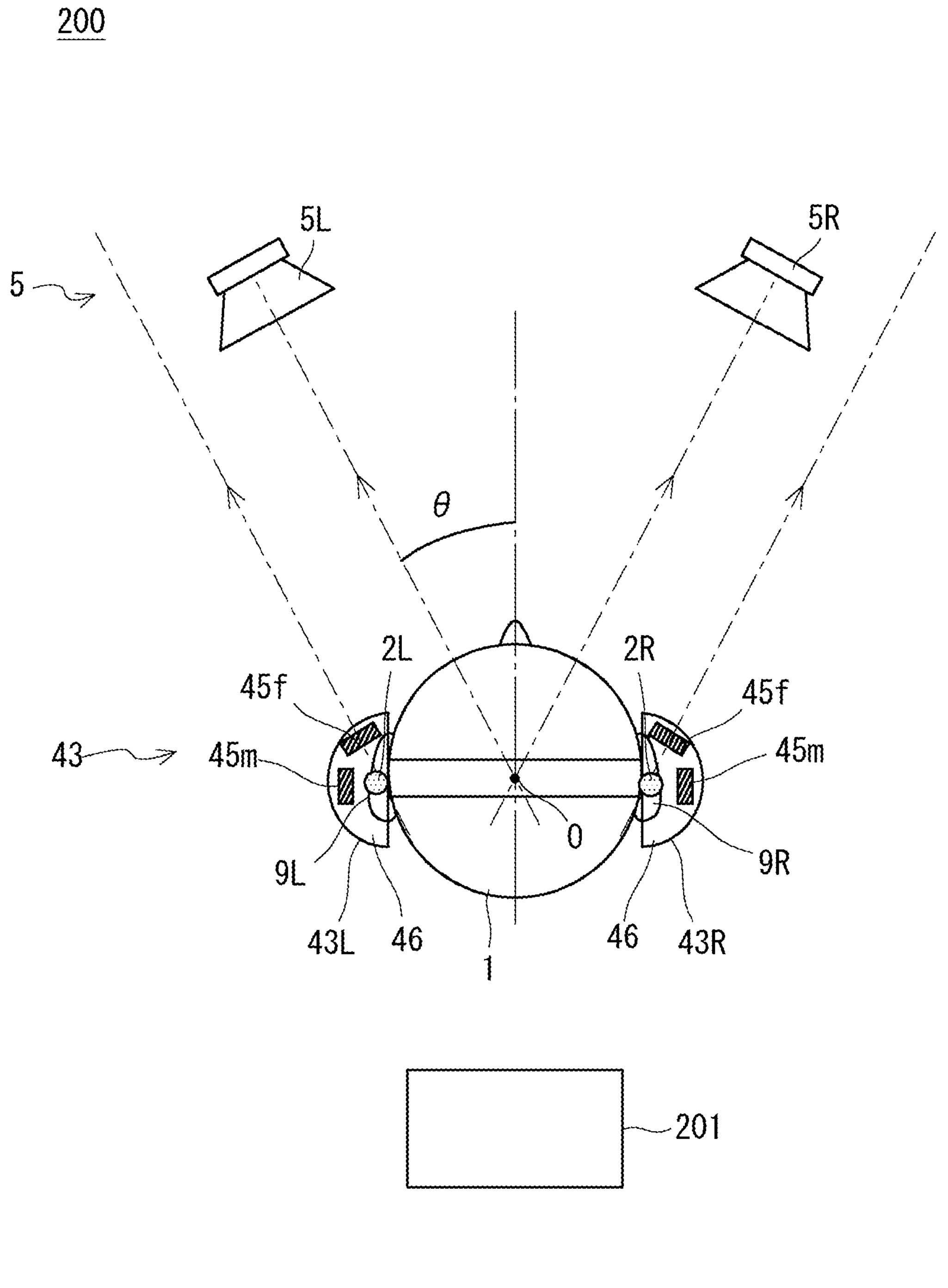
FIG. 5 is a schematic view showing the placement of headphones drivers.

The ear canal transfer characteristics measured by user measurement is described with reference to FIG. 5. FIG. 5 is a schematic view showing the placement of the driver of the headphones 43 used for the user measurement. The headphones 43 has a left unit 43L and the right unit 43R each having a housing 46. Two drivers **45*f* and 45*m* are provided in the housing 46. The housing 46 is a casing that holds the two drivers, 45*f* and 45*m*. The left unit 43L and the right unit 43**R are placed symmetrically.

The drivers **45*f* and 45*m* each include an actuator and a diaphragm, and can output sound. The actuator is, for example, a voice coil motor or a piezoelectric element and converts an electric signal into vibration. The drivers 45*f* and 45*m*** can output sound independently.

The driver **45*m* and the driver 45*f* are placed at different positions. For example, the drivers 45*m* are respectively placed just beside the external acoustic opening of the left ear 9L and the right ear 9R. The drivers 45*f* are placed in front of the drivers 45*m*. The position where the driver 45*f* is placed is defined as the first position, and the position where the driver 45*m*** is placed is defined as the second position. The first position is in front of the second position.

The driver **45*m* and the driver 45*f* can output measurement signals at different timings. For the left ear 9L, measurement is performed on the ear canal transfer characteristics M_ECTFL from the driver 45*m* of the left unit 43L to the left microphone 2L, and the ear canal transfer characteristics F_ECTL from the driver 45*f* of the left unit 43L to the left microphone 2L. For the right ear 9R, measurement is performed on the ear canal transfer characteristics M_ECTFR from the driver 45*m* of the right unit 43R to the right microphone 2R, and the ear canal transfer characteristics F_ECTFL from the driver 45*f* of the right unit 43R to the right microphone 2**R.

The ear canal transfer characteristics F_ECTFL is a transfer characteristics from the first position of the left unit 43L to the microphone 2L. The car canal transfer characteristics F_ECTFR is a transfer characteristics from the first position of the right unit 43R to the microphone 2R. The ear canal transfer characteristics M_ECTFL is a transfer characteristics from the second position of the left unit 43L to the microphone 2L. The car canal transfer characteristics M_ECTFR is a transfer characteristics from the second position of the right unit 43R to the microphone 2R. The ear canal transfer characteristics F_ECTFL and F_ECTFR are referred to as the first ear canal transfer characteristics or their measurement data. The ear canal transfer characteristics M_ECTFL and M_ECTFR are referred to as the second ear canal transfer characteristics or their measurement data. The first ear canal transfer characteristics and the second ear canal transfer characteristics are measured by impulse response measurement using the microphone unit 2 and the headphones 43.

Preferably, the driver **45*f* is placed at a position corresponding to the placement of the stereo speaker 5 in FIG. 2. For example, as shown in FIG. 5, it is assumed that the left speaker 5L is installed in the direction of the opening angle θ, with the direct front of the person 1 being measured being 0°. In this case, the direction from the microphone 2L toward the driver 45*f* is preferably parallel to the direction of the opening angle θ. In other words, the direction from the head center O of the person 1 being measured toward the speaker 5L and the direction from the microphone 2L toward the driver 45*f* are preferably parallel in the top view. Note that, when the stereo speaker 5 is placed in front of the person 1 being measured, the opening angle θ is in the range of 0 to 90°, and is preferably 30°. The right speaker 5R and the driver 45*f* of the right unit 43**R are also placed in the same manner.

The driver **45*m* is placed on the lateral side of the ear canal. The driver 45*m* is preferably in the same position and type as the driver of the headphones 43** that performs out-of-head localization reproduction.

The transmitting unit 113 transmits user data related to the ear canal transfer characteristics to the server device 300. The user data is data based on the first ear canal transfer characteristics F_ECTFL and F_ECTFR. The user data may be time domain data or frequency domain data. The user data may be all or a part of the frequency-amplitude characteristics. Alternatively, the user data may be a feature quantity extracted from the frequency-amplitude characteristics.

The inverse filter calculation unit 121 calculates the inverse filter based on the second ear canal transfer characteristics M_ECTFL and M_ECTFR. For example, the inverse filter calculation unit 121 corrects the frequency-amplitude characteristics and the frequency-phase characteristics of the second car canal transfer characteristics M_ECTFL and M_ECTFR. The inverse filter calculation unit 121 calculates a temporal signal by using frequency characteristics and phase characteristics by inverse discrete Fourier transform. The inverse filter calculation unit 121 calculates an inverse filter by cutting out the temporal signal with a specified filter length.

As described above, the inverse filter is a filter that cancels out headphone characteristics (characteristics between a reproduction unit of headphones and a microphone). The filter storage unit 122 stores left and right inverse filters calculated by the inverse filter calculation unit 121. Note that a known technique can be used for calculating an inverse filter, and therefore a method of calculating an inverse filter is not described in detail.

Figure 6:
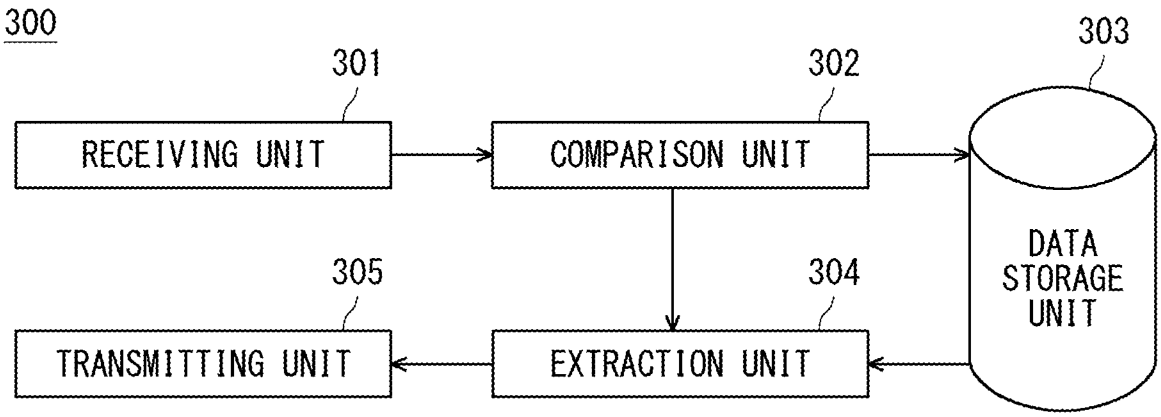
FIG. 6 is a view showing the structure of a server device in the out-of-head localization filter determination system.

The structure of the server device 300 is described hereinafter with reference to FIG. 6. FIG. 6 is a block diagram showing a control structure of the server device 300. The server device 300 includes a receiving unit 301, a comparison unit 302, a data storage unit 303, an extraction unit 304, and a transmitting unit 305. The server device 300 serves as a filter determination device that determines the spatial acoustic filter based on the ear canal transfer characteristics. Note that, when the out-of-head localization processing device 100 and the server device 300 are an integral device, this device does not need to include the transmitting unit 305.

The server device 300 is a computer including a processor, a memory and the like, and performs the following processing according to a program. Further, the server device 300 is not limited to a single device, and it may be implemented by combining two or more devices, or may be a virtual server such as a cloud server. The data storage unit that stores data, and the comparison unit 302 and the extraction unit 304 that perform data processing may be physically separate devices.

The receiving unit 301 receives the user data transmitted from the out-of-head localization processing device 100. The receiving unit 301 performs processing (for example, demodulation) in accordance with a communication standard on the received user data. The comparison unit 302 compares the user data with the preset data stored in the data storage unit 303. Here, the receiving unit 301 receives the first ear canal transfer characteristics F_ECTFL and F_ECTFR, which have been measured by the user measurement, as user data. The user data of the first ear canal transfer characteristics F_ECTFL and F_ECTFR serve as user data F_ECTFL_U and F_ECTFR_U.

The data storage unit 303 is a database that stores, as preset data, data related to a plurality of persons being measured and measured by pre-measurement. The data stored in the data storage unit 303 is described hereinafter with reference to FIG. 7. FIG. 7 is a table showing the data stored in the data storage unit 303.

The data storage unit 303 stores preset data for each of the left and right ears of a person being measured. To be specific, the data storage unit 303 is in table format where the ID of person being measured, left/right of the ears, the first ear canal transfer characteristics, spatial acoustic transfer characteristics 1, and spatial acoustic transfer characteristics 2 are placed in one row. Note that the data format shown in FIG. 7 is an example, and a data format where objects of each parameter are held in association by tag or the like may be used instead of the table format.

Two data sets are stored for one person A being measured in the data storage unit 303. Specifically, a data set related to the left ear of the person A being measured and a data set related to the right ear of the person A being measured are stored in the data storage unit 303.

One data set includes the ID of person being measured, left/right of the ears, the first ear canal transfer characteristics, the spatial acoustic transfer characteristics 1, and the spatial acoustic transfer characteristics 2. The first ear canal transfer characteristics are data based on the second pre-measurement by the measurement device 200 shown in FIG. 3. The first ear canal transfer characteristics are the frequency-amplitude characteristics of the first ear canal transfer characteristics from the first position in front of the external acoustic opening to the microphones 2L and 2R.

The first ear canal transfer characteristics of the left ear of the person A being measured is referred to as the first ear canal transfer characteristics F_ECTFL_A, and the first ear canal transfer characteristics of the right ear of the person A being measured is referred to as the first car canal transfer characteristics F_ECTFR_A. The first ear canal transfer characteristics of the left ear of the person B being measured is referred to as the first car canal transfer characteristics F_ECTFL_B, and the first ear canal transfer characteristics of the right ear of the person B being measured is referred to as the first ear canal transfer characteristics F_ECTFR B. The first ear canal transfer characteristics are data measured using a driver **45*f* placed in front of the external acoustic opening, as shown in FIG. 5. The headphones 43 and the driver 45*f*** used for the user measurement and the second pre-measurement are preferably of the same type, but may be of different types.

The spatial acoustic transfer characteristics 1 and the spatial acoustic transfer characteristics 2 are data based on the first pre-measurement by the measurement device 200 shown in FIG. 2. In the case of the left ear of the person A being measured, the spatial acoustic transfer characteristics 1 are Hls_A, and the spatial acoustic transfer characteristics 2 are Hro_A. In the case of the right ear of the person A being measured, the spatial acoustic transfer characteristics 1 are Hrs_A, and the spatial acoustic transfer characteristics 2 are Hlo_A. In this manner, two spatial acoustic transfer characteristics for one ear are paired. For the left ear of the person 13 being measured. Hls_B and Hro_B are paired, and for the right ear of the person B being measured, Hrs_B and Hlo_B are paired. The spatial acoustic transfer characteristics 1 and the spatial acoustic transfer characteristics 2 may be data after being cut out with a filter length, or may be data before being cut out with a filter length.

For the left ear of the person A being measured, the first ear canal transfer characteristics F_ECTFL_A, the spatial acoustic transfer characteristics Hls_A, and the spatial acoustic transfer characteristics Hro_A are associated as one data set. Likewise, for the right ear of the person A being measured, the first ear canal transfer characteristics F_ECTFR_A, the spatial acoustic transfer characteristics Hrs_A, and the spatial acoustic transfer characteristics Hlo_A are associated as one data set. Likewise, for the left ear of the person B being measured, the first ear canal transfer characteristics F_ECTFL_B, the spatial acoustic transfer characteristics Hls_B, and the spatial acoustic transfer characteristics Hro_B are associated as one data set. Likewise, for the right ear of the person B being measured, the first ear canal transfer characteristics F_ECTFL_B, the spatial acoustic transfer characteristics Hrs_B, and the spatial acoustic transfer characteristics Hlo_B are associated as one data set.

Note that a pair of the spatial acoustic transfer characteristics 1 and 2 is the first preset data. Specifically, the spatial acoustic transfer characteristics 1 and the spatial acoustic transfer characteristics 2 that form one data set is the first preset data. The first ear canal transfer characteristics that forms one data set is the second preset data. One data set contains the first preset data and the second preset data. The data storage unit 303 stores the first preset data and the second preset data in association with each of the left and right ears of a person being measured.

It is assumed that the first and second pre-measurement is previously performed for n (n is an integer of 2 or more) number of persons 1 being measured. In this case, 2n number of data sets, which are data sets for both ears, are stored in the data storage unit 303. The first ear canal transfer characteristics stored in the data storage unit 303 are referred to as the first ear canal transfer characteristics F_ECTFL_A to the first ear canal transfer characteristics F_ECTFL_N, and the first ear canal transfer characteristics F_ECTFR_A to the first ear canal transfer characteristics F_ECTFR_N.

The comparison unit 302 compares the user data F_ECTFL_U with each of the first ear canal transfer characteristics F_ECTFL_A to F_ECTFL_N and F_ECTFR_A to F_ECTFR_N. The comparison unit 302 then selects the one most similar to the user data F_ECTFL_U, from 2n number of the first ear canal transfer characteristics F_ECTFL_A to F_ECTFL_N, and F_ECTFR_A to F_ECTFR_N. Here, the correlation between the two frequency-amplitude characteristics is calculated as the similarity score. The comparison unit 302 selects the data set of the first car canal transfer characteristics having the highest similarity score to the user data. Here, when the left ear of the person 1 being measured is selected, the selected first ear canal transfer characteristics is defined as the left selection characteristics F_ECTFL_I.

Likewise, the comparison unit 302 compares the user data F_ECTFL_U with each of the first ear canal transfer characteristics F_ECTFL_A to F_ECTFL_N and F_ECTFR_A to F_ECTFR_N. The comparison unit 302 then selects the one most similar to the user data F_ECTFL_U, from 2n number of the first ear canal transfer characteristics F_ECTFL_A to F_ECTFL_N, and F_ECTFR_A to P ECTFR_N. Here, when the right ear of the person m being measured is selected, and the selected first ear canal transfer characteristics is defined as the right selection characteristics F_ECTFR_m.

The comparison unit 302 outputs a comparison result to the extraction unit 304. To be specific, it outputs ID of the person being measured and left/right of the ears of the second preset data with the highest similarity score to the extraction unit 304. The extraction unit 304 extracts the first preset data based on the comparison result.

The extraction unit 304 reads the spatial acoustic transfer characteristics corresponding to the left selection characteristics F_ECTFL_I from the data storage unit 303. The extraction unit 304 refers to the data storage unit 303 and extracts the spatial acoustic transfer characteristics Hls_l and the spatial acoustic transfer characteristics Hro_l of the left ear of the person 1 being measured.

Likewise, the extraction unit 304 reads the spatial acoustic transfer characteristics corresponding to the right selection characteristics F_ECTFR__m from the data storage unit 303. The extraction unit 304 refers to the data storage unit 303 and extracts the spatial acoustic transfer characteristics Hrs_m and the spatial acoustic transfer characteristics Hlo_m of the left ear of the person m being measured.

In this manner, the comparison unit 302 compares user data with a plurality of second preset data. The extraction unit 304 then extracts the first preset data suitable for a user based on a comparison result between the second preset data and the user data.

Then, the transmitting unit 305 transmits the first preset data extracted by the extraction unit 304 to the out-of-head localization processing device 100.

The transmitting unit 305 performs processing (for example, modulation) in accordance with a communication standard on the first preset data and transmits this data. In this example, the spatial acoustic transfer characteristics Hls_l and the spatial acoustic transfer characteristics Hro_l are extracted as the first preset data for the left ear, and the spatial acoustic transfer characteristics Hrs_m and the spatial acoustic transfer characteristics Hlo_m are extracted as the first preset data for the right ear. Thus, the transmitting unit 305 transmits the spatial acoustic transfer characteristics Hls_l, the spatial acoustic transfer characteristics Hro_l, the spatial acoustic transfer characteristics Hrs_m and the spatial acoustic transfer characteristics Hlo_m to the out-of-head localization processing device 100.

Referring back to the description of FIG. 4, the receiving unit 114 receives the first preset data transmitted from the transmitting unit 305. The receiving unit 114 performs processing (for example, demodulation) in accordance with a communication standard on the received first preset data. The receiving unit 114 receives the spatial acoustic transfer characteristics Hls_l and the spatial acoustic transfer characteristics Hro_l as the first preset data related to the left ear, and receives the spatial acoustic transfer characteristics Hrs_m and the spatial acoustic transfer characteristics Hlo_m as the first preset data related to the right ear.

Then, the filter storage unit 122 stores the spatial acoustic filter based on the first preset data. Specifically, the spatial acoustic transfer characteristics Hls_l serves as the spatial acoustic transfer characteristics Hls of the user U, and the spatial acoustic transfer characteristics Hro_l serves as the spatial acoustic transfer characteristics Hro of the user U. Likewise, the spatial acoustic transfer characteristics Hrs_m serves as the spatial acoustic transfer characteristics Hrs of the user U, and the spatial acoustic transfer characteristics Hlo_m serves as the spatial acoustic transfer characteristics Hlo of the user U.

Note that, when the first preset data is data after being cut out with a filter length, the out-of-head localization processing device 100 stores the first preset data as the spatial acoustic filter. For example, the spatial acoustic transfer characteristics Hls_l serves as the spatial acoustic transfer characteristics Hls of the user U. On the other hand, when the first preset data is data before being cut out with a filter length, the out-of-head localization processing device 100 performs processing of cutting out the spatial acoustic transfer characteristics with a filter length.

The arithmetic processing unit 120 performs processing by using the spatial acoustic filters corresponding to the four spatial acoustic transfer characteristics Hls, Hlo, Hro and Hrs and the inverse filters. The arithmetic processing unit 120 is composed of the out-of-head localization unit 10, the filter unit 41 and the filter unit 42 shown in FIG. 1. Thus, the arithmetic processing unit 120 carries out the above-described convolution calculation or the like on the stereo input signal by using the four spatial acoustic filters and two inverse filters.

As described above, the data storage unit 303 stores the first preset data and the second preset data in association for each person 1 being measured. The first preset data is data related to the spatial acoustic transfer characteristics of the person 1 being measured. The second preset data is data related to the first ear canal transfer characteristics of the person 1 being measured.

The comparison unit 302 compares the user data with the second preset data. The user data is data related to the first ear canal transfer characteristics obtained by the user measurement. The comparison unit 302 then determines the person 1 being measured similar to the first ear canal transfer characteristics of the user and left/right of the ears.

The extraction unit 304 reads the first preset data corresponding to the determined person being measured and left/right of the ears. Then, the transmitting unit 305 transmits the extracted first preset data to the out-of-head localization processing device 100. The out-of-head localization processing device 100, which is the user terminal, performs out-of-head localization by using the spatial acoustic filter based on the first preset data and the inverse filter based on the measurement data.

In this manner, it is possible to determine an appropriate filter without the need for the user U to measure the spatial acoustic transfer characteristics. This eliminates the need for the user to go to a listening room or the like or install speakers or the like in the user's home. The user measurement is performed with headphones being worn. Thus, the ear canal transfer characteristics of an individual user can be measured if the user U wears headphones and a microphone. It is thereby possible to achieve out-of-head localization with high localization effect in a simple and convenient way. It is preferred that the headphones 43 used for user measurement and out-of-head localization listening are of the same type.

Further, in this embodiment, two drivers 45*m* and 45*f* are used. The second ear canal transfer characteristics measured by the driver 45*m* is used to generate the inverse filter. Further, the first car canal transfer characteristics measured by the driver 45*f* is used for determining the spatial acoustic filter. In other words, the spatial acoustic filter is determined by matching of the user data related to the first car canal transfer characteristics with the second preset data. In this manner, a more appropriate out-of-head localization filter can be used.

The stereo speaker 5 placed in front of the person 1 being measured is used for generating the spatial acoustic filter, that is, for measuring the spatial acoustic transfer characteristics. The spatial acoustic transfer characteristics is measured by the microphone unit 2 picking up the measurement signal arriving diagonally from the front. The driver 45*f* placed in front of the external acoustic opening is used for measuring the first ear canal transfer characteristics. According to this embodiment, the measurement signal for measuring the first ear canal transfer characteristics and the measurement signal for measuring the spatial acoustic transfer characteristics can have the same incident angle.

The direction from the microphone to the first position is in the direction from the person being measured to the speaker. This makes it easy to infer the relationship between the spatial acoustic transfer characteristics and the ear canal transfer characteristics, and consequently allows the matching accuracy to be improved. This also allows using a more appropriate spatial acoustic filter to perform out-of-head localization processing.

On the other hand, the second ear canal transfer characteristics measured by the driver 45*m* is used to generate the inverse filter. In performing the out-of-head localization processing, the headphones 43 normally have the driver in the vicinity of the position just beside the external acoustic opening. This allows using a more appropriate inverse filter to perform the out-of-head localization processing.

The headphones 43 for user measurement and headphones 43 for the second pre-measurement are preferably of the same type, but may be of different types. In other words, the driver 45*f* for user measurement and driver 45*f* for the second pre-measurement may be of different types, and may be placed at different positions. The incident angles of the measurement signals in the first pre-measurement, the second pre-measurement, and the user measurement are preferably the same, but may be different.

Further, different headphones 43 may be used in the measurement of the first ear canal transfer characteristics and the second ear canal transfer characteristics. For example, the headphones 43 having only a driver 45*f* may be used for the measurement of the first ear canal transfer characteristics, and the headphones 43 having only a driver 45*m* may be used for the measurement of the second ear canal transfer characteristics. Thus preparing two types of headphones 43 allows user measurement to use headphones 43 having one driver on each of left and right sides.

Further, in a method according to this embodiment, it is not necessary to perform audibility tests to listen to a large number of preset characteristics and to measure detailed physical characteristics. It is thereby possible to reduce the burden on a user and enhance the convenience. Then, the data of a person being measured and a user are compared to thereby select a person being measured having similar characteristics. The extraction unit 304 then extracts the first preset data of the ear of the selected person being measured, and it is thus possible to expect high out-of-head localization effect.

In this manner, it is possible to determine an appropriate filter without performing the user measurement of the spatial acoustic transfer characteristics. This enhances the convenience. Further, the extraction unit 304 may extract two or more first preset data. Based on the results of the audibility tests, the user may determine the optimal out-of-head localization filter. In this case as well, the number of audibility tests can be reduced, so that the burden on the user can be reduced.

Modified Example 1

In a first modified example, the first and second ear canal transfer characteristics are used for matching the ear canal transfer characteristics between the user data and the second preset data. Therefore, the transmitting unit 113 transmits not only the first ear canal transfer characteristics F_ECTFL and F_ECTFR but also the second ear canal transfer characteristics M_ECTFL and M_ECTFR, as user data. The out-of-head localization processing device 100 transmits user data related to the first and second ear canal transfer characteristics to the server device 300. The preset data stored in the server device 300 is described hereinafter with reference to FIG. 8.

FIG. 8 is a table showing the preset data in the first modified example. The second preset data includes the first and second ear canal transfer characteristics. The second preset data includes the first and second ear canal transfer characteristics. For the left ear of person A being measured, the first ear canal transfer characteristics F_ECTFL_A, the second ear canal transfer characteristics M_ECTFL_A, the spatial acoustic transfer characteristics Hls_A, and the spatial acoustic transfer characteristics Hro_A are associated to form one data set. Likewise, for the right ear of person A being measured, the first ear canal transfer characteristics F_ECTFR_A, the second ear canal transfer characteristics M_ECTFR_A, the spatial acoustic transfer characteristics Hrs_A, and the spatial acoustic transfer characteristics Hlo_A are associated to form one data set.

In this embodiment, the first and second ear canal transfer characteristics are the second preset data. The comparison unit 302 of the server device 300 obtains the correlation between the user data and the preset data for each of the first and second ear canal transfer characteristics. Specifically, the comparison unit 302 obtains a first correlation between the user data and the preset data for the first ear canal transfer characteristics. Likewise, the comparison unit 302 obtains a second correlation between the user data and the preset data for each of the second ear canal transfer characteristics.

The comparison unit 302 obtains the similarity score based on the two correlations. The similarity score can be, for example, a simple average or a weighted average of the first and second correlations. The extraction unit 304 extracts the first preset data in the data set with the highest similarity score. Thus using two or more ear canal transfer characteristics for matching allows extracting preset data suitable for the user. As a result, the out-of-head localization filter can be determined with higher accuracy.

Second Embodiment

Figure 9:
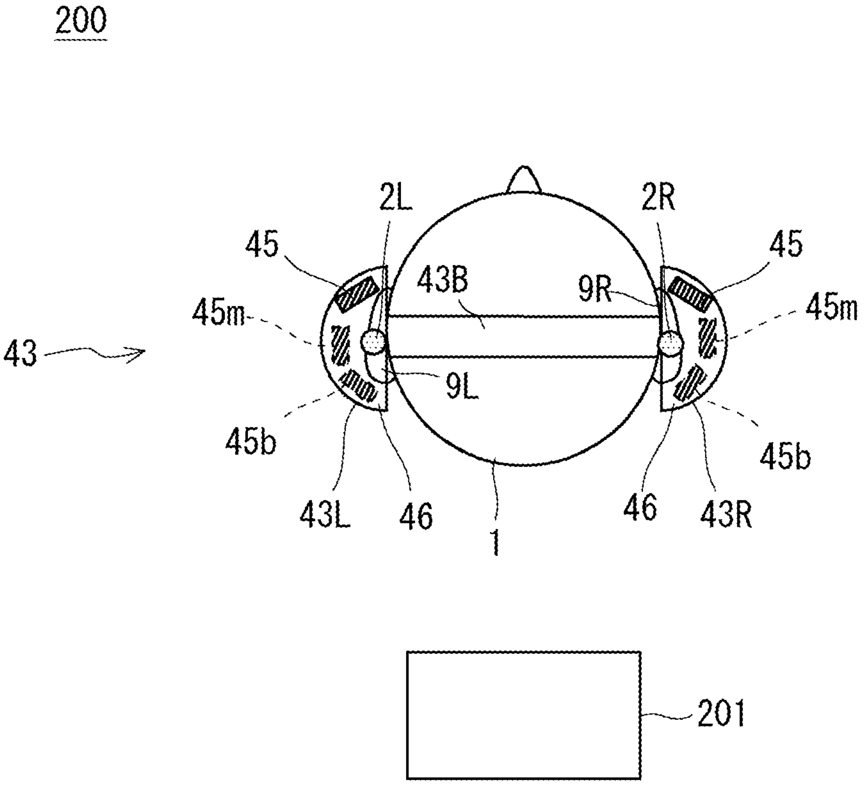
FIG. 9 is a schematic view showing headphones according to a second embodiment.

Headphones 43 used in this embodiment is described hereinafter with reference to FIG. 9. In the embodiment, the position of a driver 45 is variable in the headphones 43. The overall basic structure of the out-of-head localization filter determination system 500 is the same as that of the first embodiment, so the description thereof is omitted.

The relative position of the driver 45 with respect to the left microphone 2L and the right microphone 2R can be changed. For example, the position of the driver 45 can be adjusted in the housing 46. The incident angle at which the measurement signal is incident on the microphone can be set to any angle. Then, the measurement is performed when the driver 45 is at a first position, a second position, and a third position. Note that, in FIG. 9, the driver 45 at the first position is shown by a solid line, and the driver 45 at the second position and the third position is shown by a broken line as drivers 45*m* and 45*b*.

The first position and the second position are the same positions as those in the first embodiment. In the same manner as the first embodiment, the ear canal transfer characteristics obtained by the measurement at the first position are defined as the first ear canal transfer characteristics F_ECTFL and F_ECTFR, and the ear canal transfer characteristics obtained by the measurement at the second position are defined as the second ear canal transfer characteristics M_ECTFL and M_ECTFR. The third position is on the rear side of the second position. The third position is on the rear side of the external acoustic opening. The ear canal transfer characteristics obtained by the measurement at the third position are defined as the third car canal transfer characteristics B_ECTFL and B_ECTFR.

In this embodiment, all the measurement data, which are the first ear canal transfer characteristics F_ECTFL and F_ECTFR, the second ear canal transfer characteristics M_ECTFL and M_ECTFR, and the third ear canal transfer characteristics B_ECTFL and B_ECTFR, are transmitted to the server device 300 as user data.

In this embodiment, the out-of-head localization processing is performed using 5.1ch reproduced signals. In the case of 5.1ch, there are six speakers. Specifically, the measurement environment of the measurement device 200 has a center speaker (front speaker), a right front speaker, a left front speaker, a right rear speaker, a left rear speaker, and a bass subwoofer speaker, placed therein. As a result, a center speaker, a left rear speaker, a right rear speaker, and a subwoofer speaker are added to the measurement device 200 shown in FIG. 2. The center speaker is placed in direct front of the person 1 being measured. The center speaker is placed, for example, between the left front speaker and the right front speaker.

The spatial acoustic transfer characteristics from the left front speaker to the left ear and the right ear are respectively defined as Hls and Hlo, as in the first embodiment. The spatial acoustic transfer characteristics from the right front speaker to the left ear and the right ear are respectively defined as Hro and Hrs, as in the first embodiment. the spatial acoustic transfer characteristics from the center speaker to the left ear and right ear are respectively defined as CHl and CHr. The spatial acoustic transfer characteristics from the left rear speaker to the left ear and the right ear are respectively defined as SHls and SHlo. The spatial acoustic transfer characteristics from the right rear speaker to the left ear and the right ear are respectively defined as SHro and SHrs. The spatial acoustic transfer characteristics from the subwoofer speaker for bass output to the left ear and right ear are respectively defined as SWHl and SWHr.

The server device 300 obtains the spatial acoustic transfer characteristics for each speaker by performing matching. Depending on the speaker, the ear canal transfer characteristics used for matching are changed. For example, the first ear canal transfer characteristics is used for matching for the left front speaker and the right front speaker, as in the first embodiment. In this case, the preset data is the same as in FIG. 7. Alternatively, as shown in FIG. 8, the first and second car canal transfer characteristics may be used for matching.

For the left rear speaker and the right rear speaker, the third ear canal transfer characteristics from the third position to the microphone is used for matching. The third position is the position on the rear side of the external acoustic opening, shown in the driver 45*b* of FIG. 9. It is preferable to align the incident angles of the measurement signals from the drivers 45*b* with the installation directions of the left rear speaker and the right rear speaker. Hereinafter, processing of obtaining the spatial acoustic transfer characteristics SHls and SHro or the spatial acoustic transfer characteristics SHlo and SHrs is described.

FIG. 10 is a table showing preset data for obtaining the spatial acoustic transfer characteristics SHls and SHro, or the spatial acoustic transfer characteristics SHlo and SHrs. For the left ear of person A being measured, the second spatial acoustic transfer characteristics M_ECTFL_A, the third ear canal transfer characteristics B__ECTFL_A, the spatial acoustic transfer characteristics SHls_A, and the spatial acoustic transfer characteristics SHro_A are associated to form one data set. Likewise, for the right car of person A being measured, the second ear canal transfer characteristics M_ECTFR_A, the third ear canal transfer characteristics B_ECTFR_A, the spatial acoustic transfer characteristics SHrs_A, and the spatial acoustic transfer characteristics SHlo_A are associated to form one data set.

Then, the comparison unit 302 obtains the correlation between the second preset data and the user data for the second and third ear canal transfer characteristics. The extraction unit 304 extracts the first preset data related to the spatial acoustic transfer characteristics SHls and SHlo, or the spatial acoustic transfer characteristics SHro, SHrs based on the similarity score according to the correlation. The correlation between the user data and the preset data related to the second ear canal transfer characteristics are defined as the second correlation, and the correlation between the user data and the preset data related to the third ear canal transfer characteristics are defined as the third correlation.

The comparison unit 302 obtains the similarity score based on the two correlations. The similarity score can be, for example, a simple average or a weighted average of the second and third correlations. The extraction unit 304 extracts the first preset data in the data set with the highest similarity score. Thus using two or more ear canal transfer characteristics for matching allows extracting preset data suitable for the user. As a result, the out-of-head localization filter can be determined with higher accuracy.

As described above, the second preset data associated with the first preset data is changed depending on the relative position of the speaker with respect to the person 1 being measured. Specifically, for the left front speaker and the right front speaker in front of the user, the first ear canal transfer characteristics measured by the driver 45 placed in front of the external acoustic opening is used for matching. For the left rear speaker and the right rear speaker on the rear side of the user, the third ear canal transfer characteristics measured by the driver 45*b* placed on the rear side of the external acoustic opening is used for matching.

Matching is also performed using one or more ear canal transfer characteristics for CHl and CHr, which are the spatial acoustic transfer characteristics from the center speaker to the left ear and right ear. Matching is also performed using one or more ear canal transfer characteristics for SWHl and SWHr, which are the spatial acoustic transfer characteristics from the subwoofer speaker for bass output to the left ear and right ear. Since the subwoofer speaker and the center speaker are placed in front of the person 1 being measured, it is preferable to measure with the driver 45 placed in front of the external acoustic opening. The frequency band of the subwoofer speaker has low directivity, so that matching may be performed using the ear canal transfer characteristics measured at any driver position regardless of the positional relationship between the person 1 being measured and the subwoofer speaker.

For the speaker in front of the person 1 being measured, matching is performed using the ear canal transfer characteristics from the first position to the microphone. For the speaker on the rear side of the person 1 being measured, matching is performed using the ear canal transfer characteristics from the third position to the microphone. This can align the incident angles of the measurement signal, so that a more appropriate out-of-head localization filter can be set. The incident angle of the measurement signal from the driver and the incident angle of the measurement signal from the speaker do not need to be exactly the same.

Of course, not only 5.1ch but also 7.1ch and 9.1ch speakers can be used. In this case as well, the spatial acoustic filter from each speaker to the left and right ears can be obtained by matching of the ear canal transfer characteristics. Then, it is just required that the weight of the weighted addition is adjusted according to the placement of the speakers.

Further, when three or more ear canal transfer characteristics are measured, three or more car canal transfer characteristics may be used for matching. In this case, it is just required that the correlation is weighted and added with a weight according to the position of the speaker. FIG. 11 shows preset data when the three ear canal transfer characteristics are used for matching.

In FIG. 11, the second preset data includes the first to third ear canal transfer characteristics. For the left car of person A being measured, the first ear canal transfer characteristics F_ECTFL_A, the second ear canal transfer characteristics M_ECTFL_A, the third ear canal transfer characteristics B_ECTFL_A, the spatial acoustic transfer characteristics Hls_A, and the spatial acoustic transfer characteristics Hro_A are associated to form one data set. Likewise, for the right ear of person A being measured, the first ear canal transfer characteristics F_ECTFR_A, the second ear canal transfer characteristics M_ECTFR_A, the third ear canal transfer characteristics B_ECTFR_A, the spatial acoustic transfer characteristics Hrs_A, and the spatial acoustic transfer characteristics Hlo_A are associated to form one data set.

The first to third ear canal transfer characteristics are the second preset data. The comparison unit 302 of the server device 300 obtains the correlation between the user data and the preset data for each of the first to third ear canal transfer characteristics. In other words, the comparison unit 302 obtains the correlation between the user data and the preset data for the first ear canal transfer characteristics. Likewise, the comparison unit 302 obtains the correlation between the user data and the preset data for each of the second and third ear canal transfer characteristics.

The comparison unit 302 obtains the similarity score based on the three correlations. The similarity score can be, for example, a simple average or a weighted average of the first to third correlations. The extraction unit 304 extracts the first preset data in the data set with the highest similarity score. Thus using three or more ear canal transfer characteristics for matching allows extracting preset data suitable for the user. As a result, the out-of-head localization filter can be determined with higher accuracy. Further, for the ear canal transfer characteristics not used for matching, the weight of the weighted addition may be set to 0.

In the above description, the position of the driver 45 is variable in the housing 46, but a housing having three drivers 45 may be used. Alternatively, a mechanism that can adjust the position and angle of the housing 46 may be provided. Specifically, the relative position of the driver 45 with respect to the microphones 2L and 2R may be changed by adjusting the angle of the housing 46 with respect to the headphone band 43B.

Third Embodiment

In this embodiment, shape data corresponding to the shape of the head of the user and the persons being measured are used. To be specific, headphones 43 are provided with a sensor for acquiring shape data according to the shape of the head. A specific example of the sensor provided in the headphones 43 is described hereinafter.

Sensor Example 1

Figure 12:
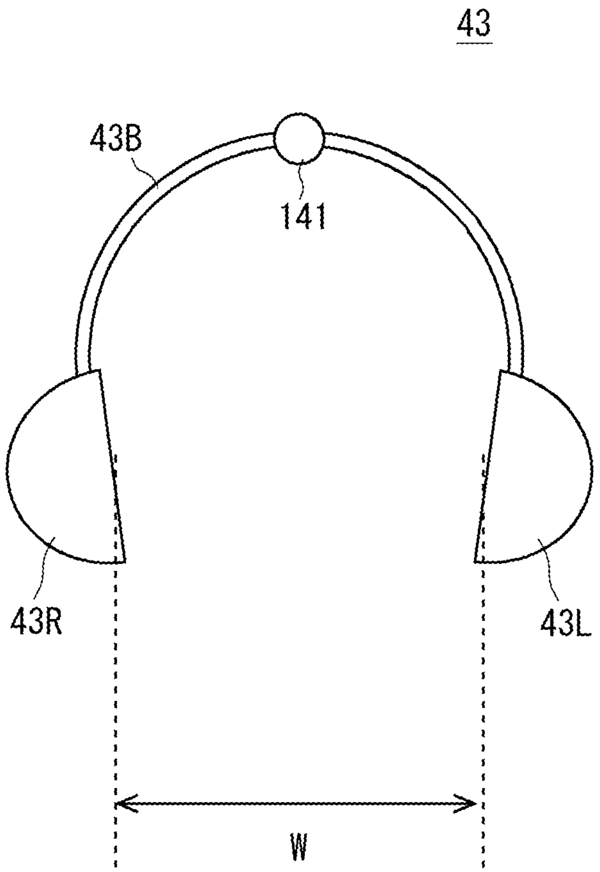
FIG. 12 is a front view showing headphones of a sensor example 1.

FIG. 12 is a front view schematically showing headphone 43 having an opening sensor 141. The headphone band 43B is provided with an opening degree sensor 141. The opening degree sensor 141 detects the amount of deformation of the headphone band 43B, that is, the opening degree of the headphones 43. As the opening degree sensor 141, an angle sensor that detects the opening angle of the headphone band 43B can be used. Alternatively, a gyro sensor or a piezoelectric sensor may be used as the opening degree sensor 141. The width W of the head is detected by the opening degree sensor 141.

Figure 13:
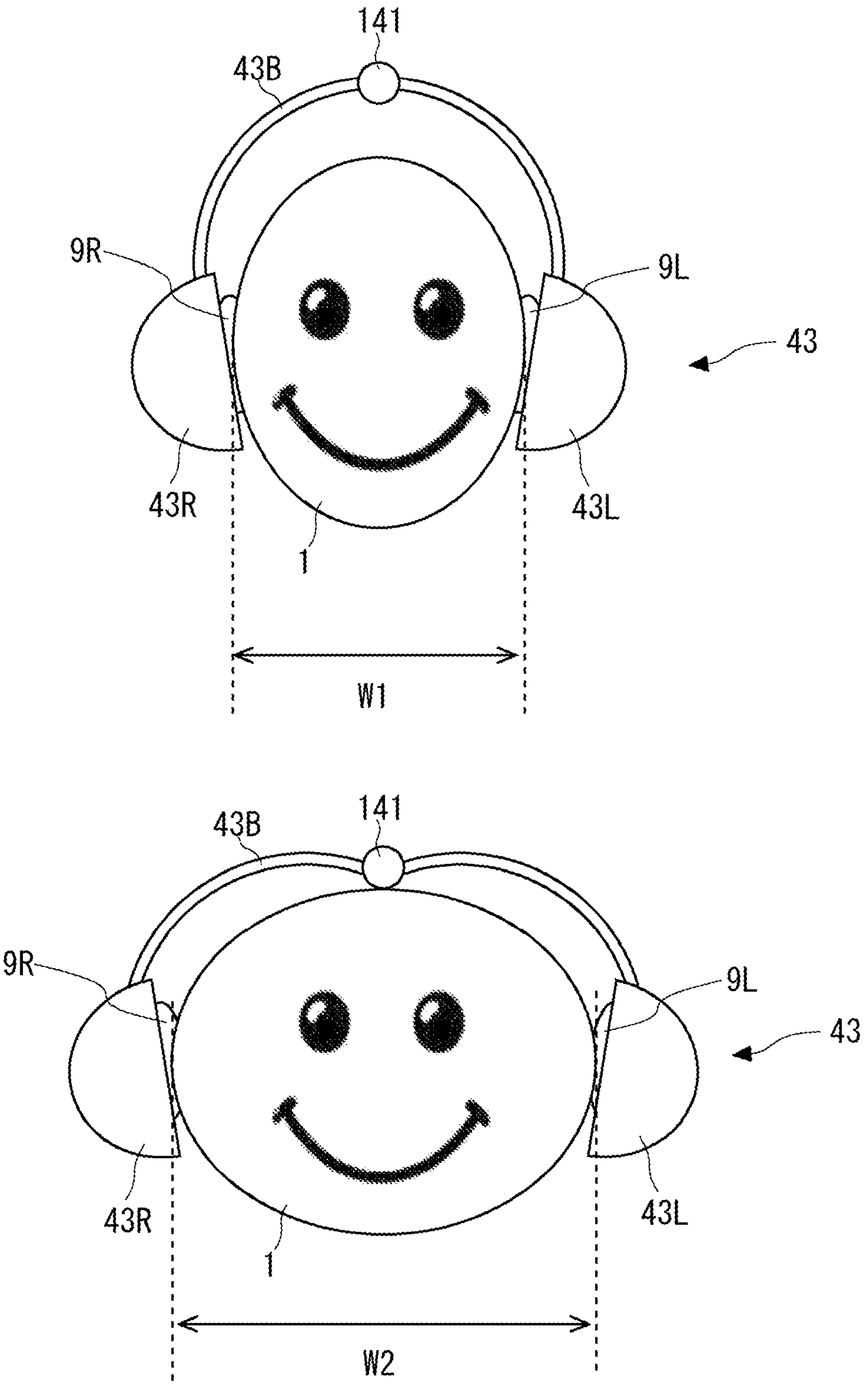
FIG. 13 is a front view showing wearing states of persons 1 being measured having different face widths.

FIG. 13 is a front view schematically showing persons 1 being measured having different head widths. The opening degree is smaller for the person 1 being measured with a narrower width W1, and the opening degree is larger for the person 1 being measured with a wider width W2. Therefore, the opening degree detected by the opening degree sensor 141 corresponds to the width W of the head. Specifically, the opening degree sensor 141 acquires the width of the head as shape data by detecting the opening angle of the headphones 43.

Sensor Example 2

Figure 14:
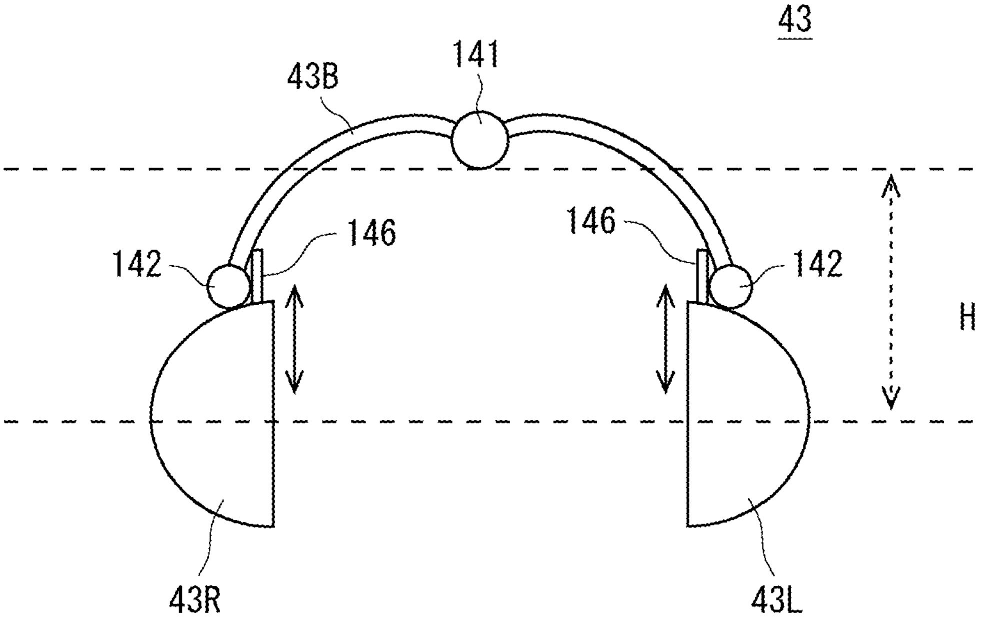
FIG. 14 is a front view showing headphones of a sensor example 2.

FIG. 14 is a front view schematically showing the headphones 43 having the slide position sensor 142. A slide mechanism 146 is provided between the headphone band 43B and the left unit 43L. A slide mechanism 146 is provided between the headphone band 43B and the right unit 43R. As shown by the solid arrow in FIG. 14, the slide mechanism 146 slides the left unit 43L and the right unit 43R up and down with respect to the headphone band 43B. Thereby, the height H from the top of the head of the person 1 being measured to the left unit 43L and the right unit 43R can be changed. The slide position sensor 142 detects the slide position (slide length) of the slide mechanism 146. The slide position sensor 142 is, for example, a rotation sensor, and detects the slide position based on the rotation angle.

Figure 15:
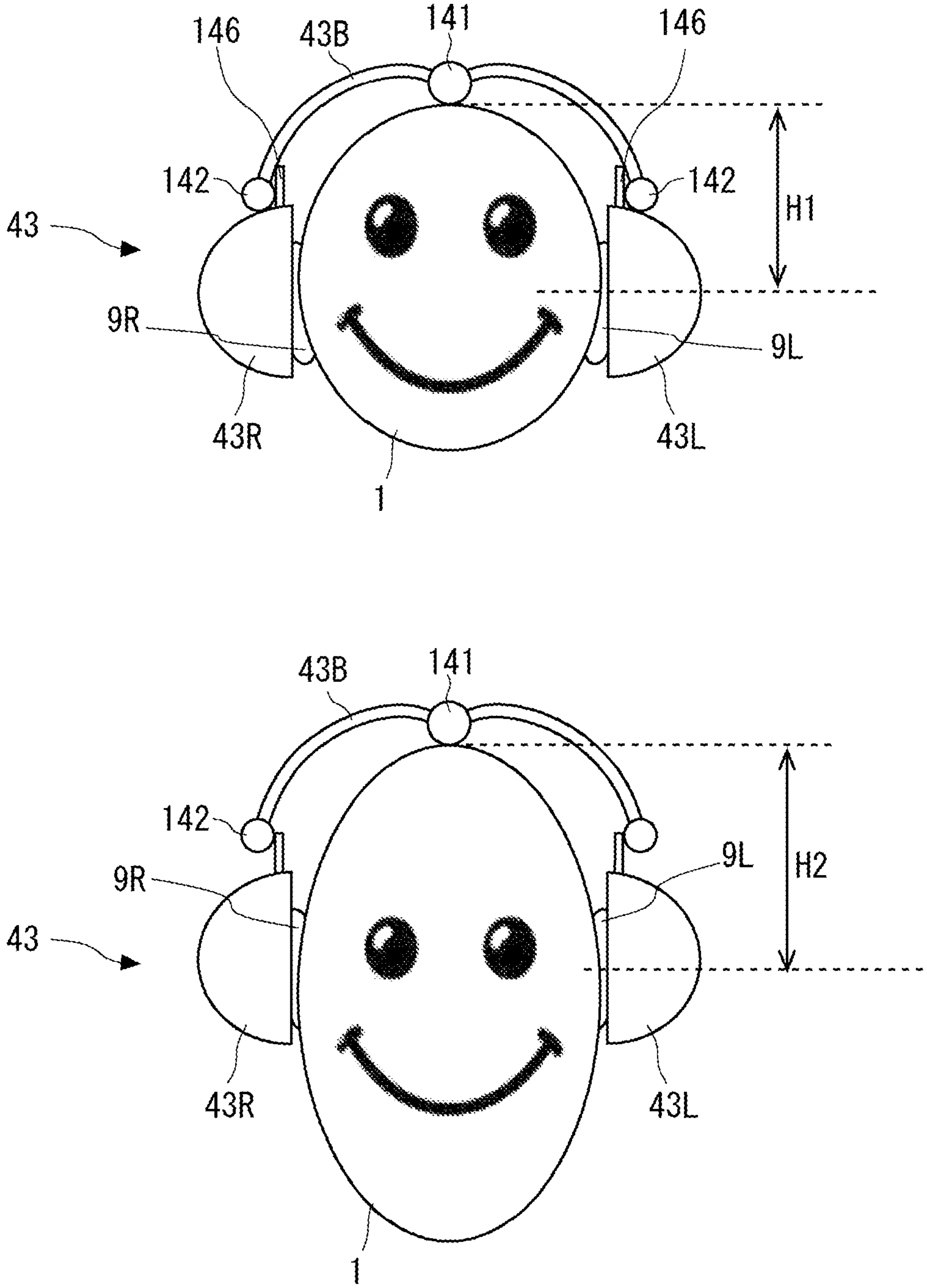
FIG. 15 is a front view showing wearing states of persons 1 being measured having different face lengths.

The slide position of the slide mechanism 146 changes according to the length of the head. FIG. 15 shows persons 1 being measured having different head lengths. Here, the heights from the top of the head to the external acoustic opening are represented by H1 and H2. The slide position changes according to the heights H1 and H2 from the top of the head to the external acoustic opening. Therefore, when the slide position sensor 142 detects the slide position of the slide mechanism 146, the length of the head can be detected as shape data.

Sensor Example 3

Figure 16:
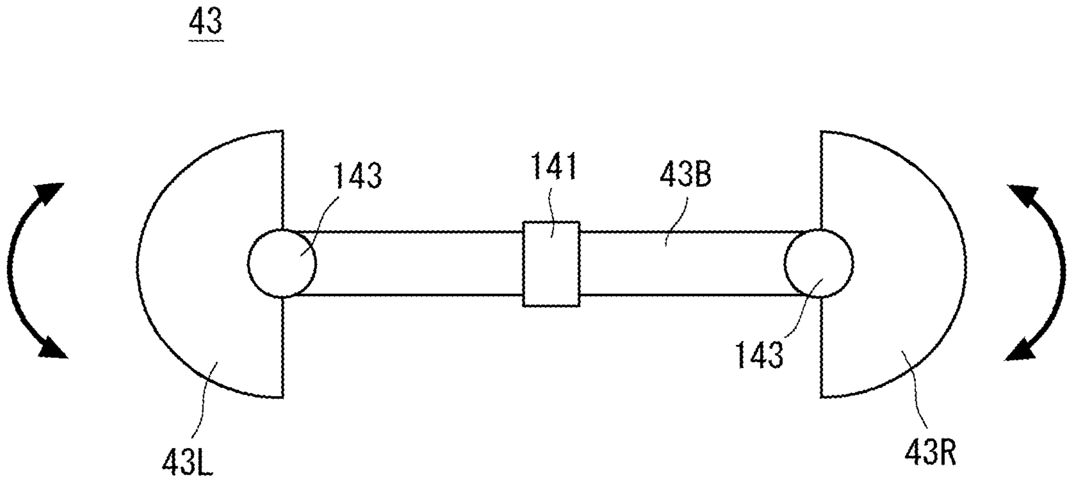
FIG. 16 is a top view showing headphones of a sensor example 3.

FIG. 16 is a top view schematically showing headphones 43 having a swivel angle sensor 143. A swivel angle sensor 143 is provided between the headphone band 43B and the left unit 43L. A swivel angle sensor 143 is provided between the headphone band 43B and the right unit 43R. The swivel angle sensor 143 detects the swivel angles of the left unit 43L and the right unit 43R of the headphones 43 individually. The swivel angle is the angle around the vertical axis of the left unit 43L or the right unit 43R with respect to the headphone band 43B (in the direction of the arrow in FIG. 16).

Figure 17:
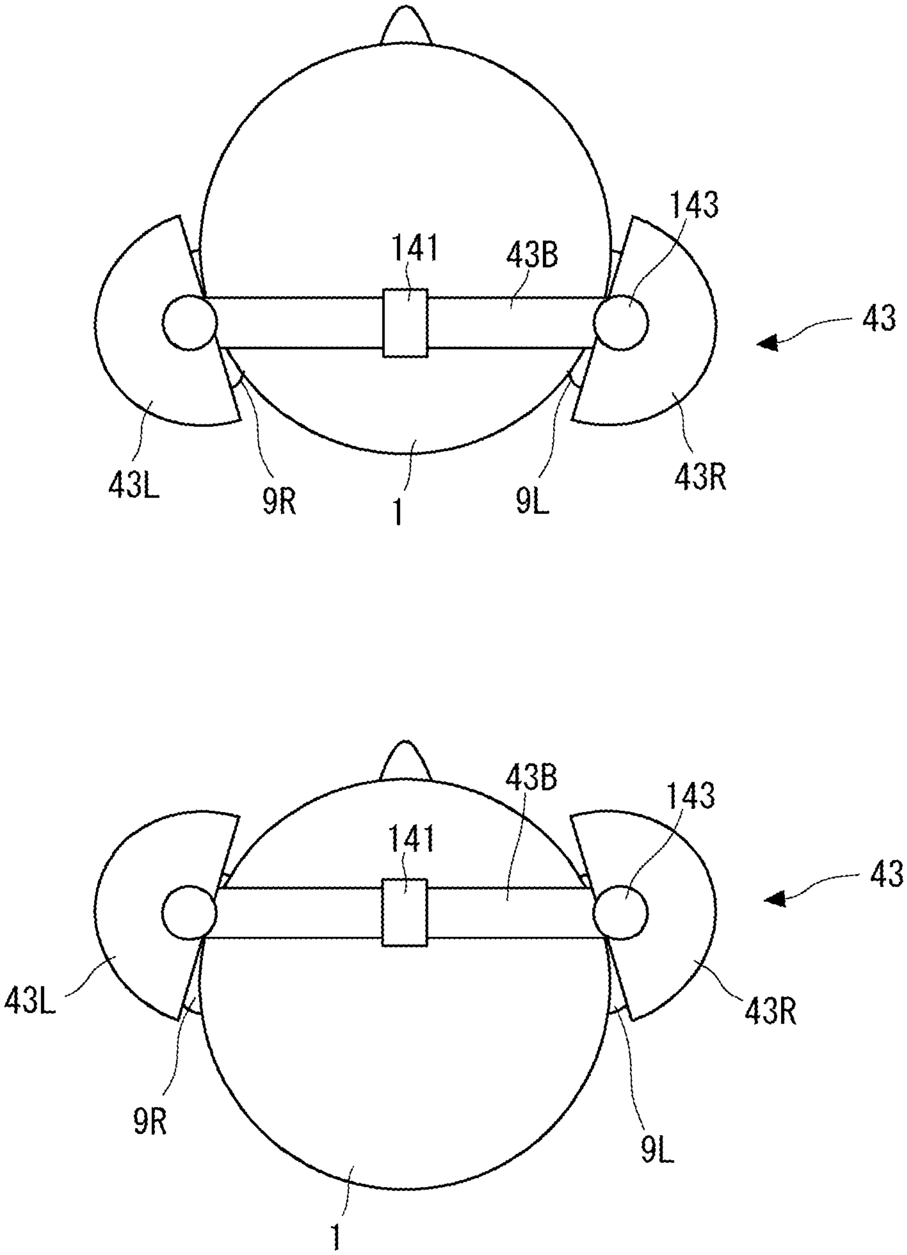
FIG. 17 is a top view showing wearing states having different swivel angles.

FIG. 17 is a top view schematically showing states where the swivel angles are different. For example, in the case of the person 1 being measured whose ear is on the rear side of the head center, the left unit 43L or the right unit 43R opens forward (as shown in the upper part of FIG. 17). Alternatively, in the case of the person 1 being measured having a wide front of the head and a narrow back of the head, the left unit 43L or the right unit 43R opens forward. In the case of the person 1 being measured whose ears are in front of the head center, the left unit 43L or the right unit 43R opens rearward (as shown in the lower part of FIG. 17). In the case of the person 1 being measured having a narrow front of the head and a wide back of the head, the left unit 43L or the right unit 43R opens backward.

Sensor Example 4

Figure 18:
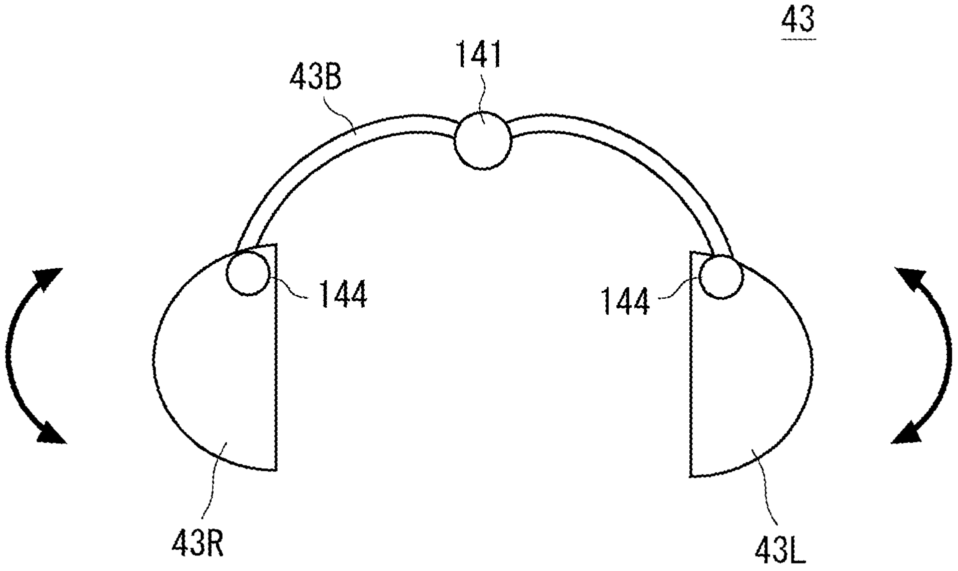
FIG. 18 is a front view showing headphones of a sensor example 4.

FIG. 18 is a front view schematically showing headphones 43 having a hanger angle sensor 144. A hanger angle sensor 144 is provided between the headphone band 43B and the left unit 43L. A hanger angle sensor 144 is provided between the headphone band 43B and the right unit 43R. The hanger angle sensors 144 respectively detect the hanger angles of the left unit 43L and the right unit 43R of the headphones 43. The hanger angle is an angle around the front-rear axis of the left unit 43L or the right unit 43R with respect to the headphone band 43B (in the direction of the arrow in FIG. 18).

Figure 19:
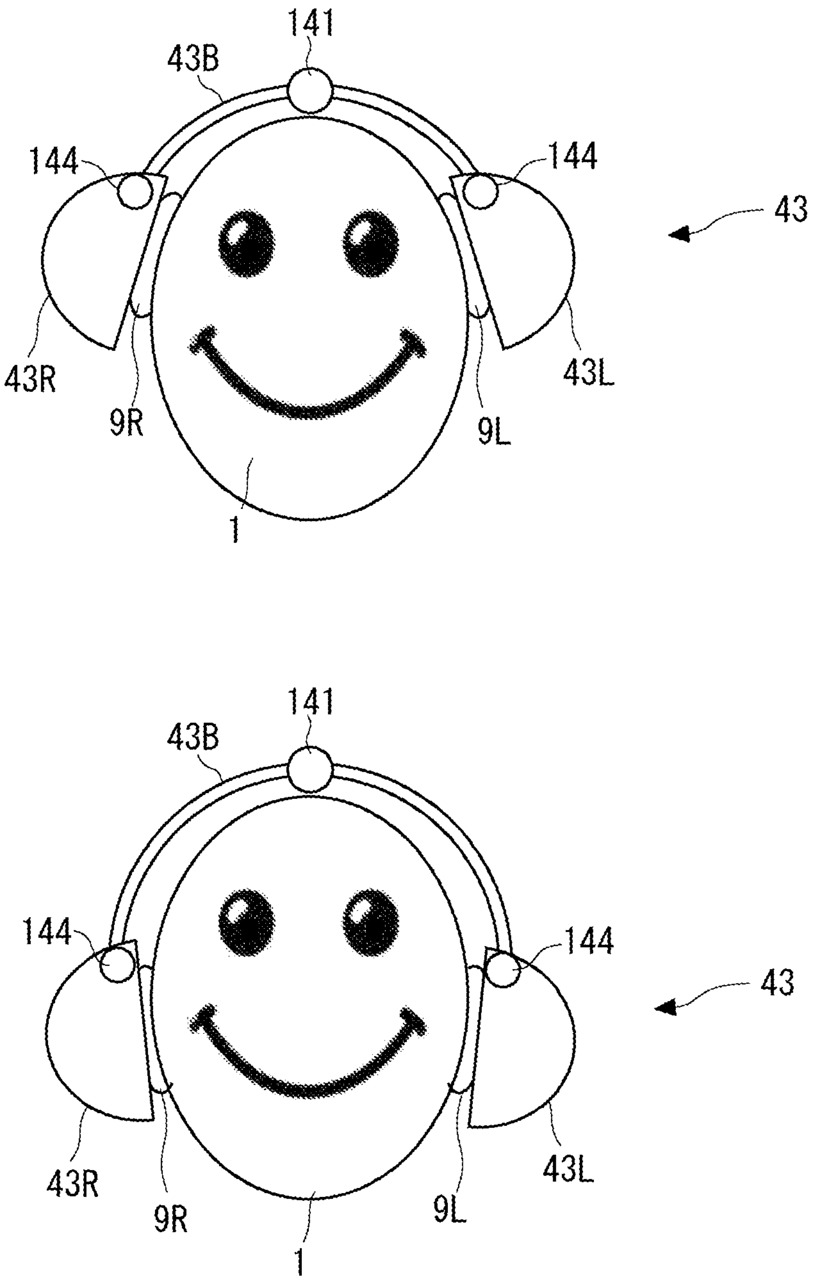
FIG. 19 is a front view showing wearing states having different hanger angles.

FIG. 19 is a front view schematically showing states where the hanger angles are different. For example, in the case of the person 1 being measured whose ear is in the upper part, the left unit 43L or the right unit 43R opens downward (as shown in the upper part of FIG. 19). Further, in the case of the person 1 being measured having a narrow face width, the left unit 43L or the right unit 43R opens upward. When the ear is in the lower part, the left unit 43L or the right unit 43R opens upward (as shown in the lower part of FIG. 19). Further, in the case of the person 1 being measured having a wide face width, the left unit 43L or the right unit 43R opens downward.

Thus using at least one of the opening degree sensor 141, the slide position sensor 142, the swivel angle sensor 143, and the hanger angle sensor 144 allows detecting shape data corresponding to the head shape of the person 1 being measured. The shape data may be represented by a relative position or angle between the left unit 43L and the right unit 43R. The shape data may be data representing the dimensions of the actual head shape.

Of course, the above sensors show an example, and shape data may be detected by providing another sensor on the headphones 43. The number of types of shape data detected for one ear is at least one, but it may be two or more in combination. When two or more types of shape data are detected for one ear, the shape data may be multidimensional vector data.

Various sensors detect shape data for each ear of the person 1 being measured. In addition, various sensors also detect shape data for the user. The data storage unit 303 of the server device 300 stores the shape data. As shown in FIG. 20, the shape data is associated with the first and second presets.

The comparison unit 302 performs matching using the shape data. For example, if the difference in shape data between the user and the persons being measured is greater than the threshold value, the data set may be excluded from matching. Alternatively, the similarity score may be calculated based on the comparison result of the shape data. In this embodiment, the server device 300 extracts the first preset data based on the shape data. This allows determining a more appropriate out-of-head localization filter.

Fourth Embodiment

As shown in the first embodiment, it is preferable to align the incident angles of the measurement signals in the first pre-measurement, the second pre-measurement, and the user measurement. On the other hand, the wearing state of the headphones 43 differs depending on the head shape of the person 1 being measured and the like. For example, the wearing angle of the housing 46 changes according to the head shape of the person 1 being measured. Then, headphones 43, which is capable of adjusting the incident angle of the measurement signal, is described in a fourth embodiment and a second modified example thereof. The fourth embodiment and the second modified example thereof need to be used for at least one of the second pre-measurement and the user measurement.

Figure 21:
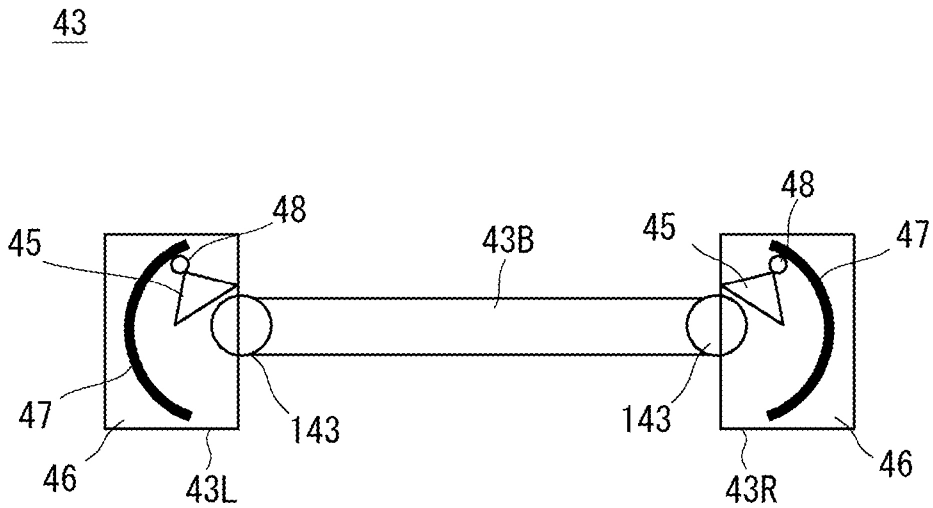
FIG. 21 is a top view schematically showing headphones of a fourth embodiment.
Figure 22:
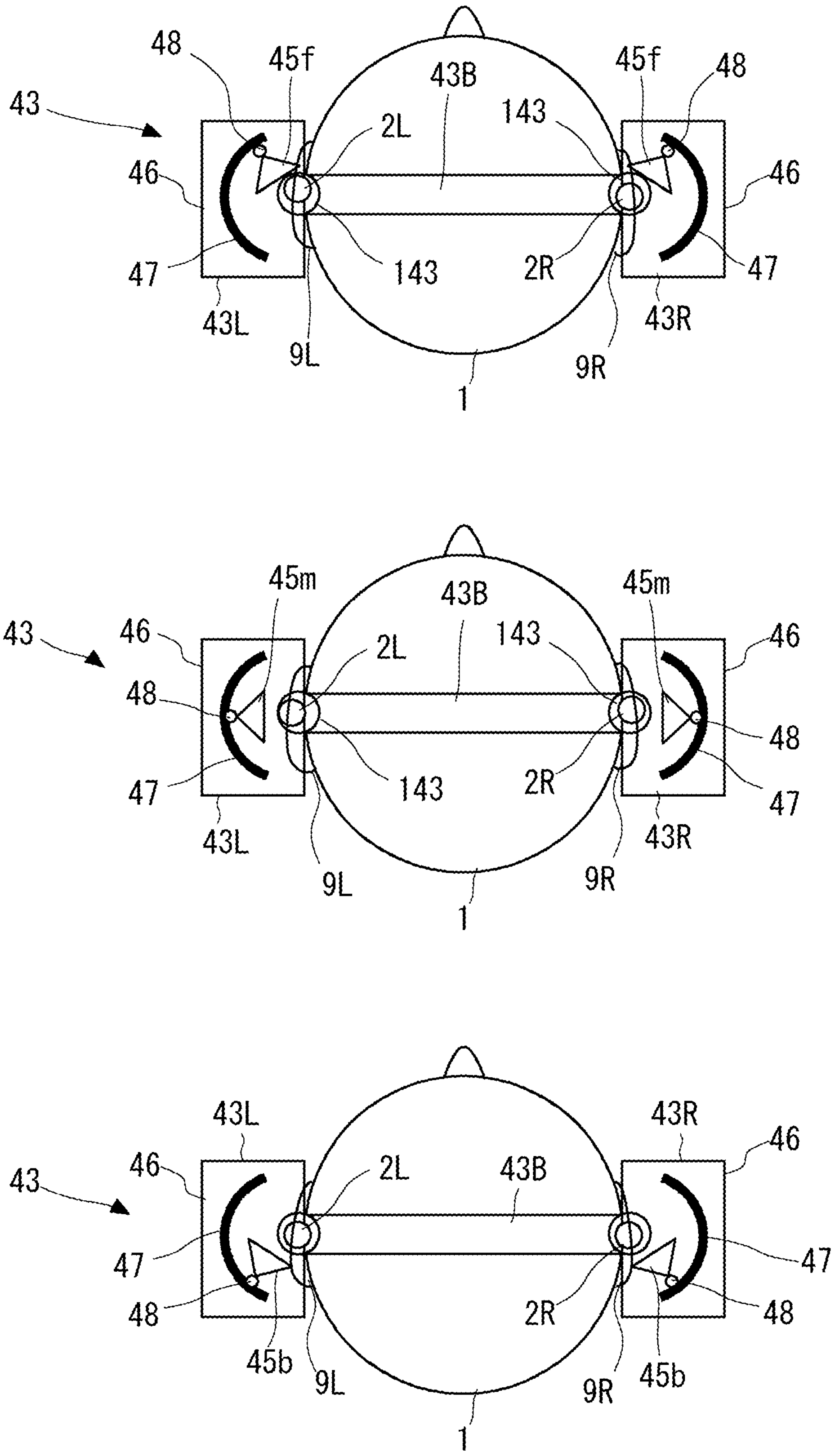
FIG. 22 is a diagram showing states where a driver position is changed in the headphones of the fourth embodiment.

FIG. 21 is a top view schematically showing the structure of headphones 43. FIG. 22 is diagrams each showing a structure in which each of drivers 45 is in the first to third positions. In FIG. 22, the driver 45 at the first position is referred to as the driver 45*f*, the driver 45 at the second position as the driver 45*m*, and the driver 45 at the third position as the driver 45*b*.

The headphones 43 include swivel angle sensors 143. Each swivel angle sensor 143 detects the swivel angle of the housing 46 as described above. The left unit 43L includes a driver 45, a housing 46, a guide mechanism 47, and a drive motor 48. The right unit 43R includes a driver 45, a housing 46, a guide mechanism 47, and a drive motor 48. The left unit 43L and the right unit 43R have a symmetrical structure, so the description of the right unit 43R is omitted as appropriate.

The driver 45, the guide mechanism 47, and the drive motor 48 are provided in the housing 46. The drive motor 48 is an actuator, such as a stepping motor or a servomotor, to move the driver 45. The guide mechanism 47 is fixed to the housing 46. The guide mechanism 47 is a guide rail with an arc shape in the top view. The guide mechanism 47 is not limited to an arc shape. For example, the guide mechanism 47 may have an elliptical shape or a hyperbolic shape.

The driver 45 is attached to the housing 46 via the guide mechanism 47. The drive motor 48 moves the driver 45 along the guide mechanism 47. Using the arc-shaped guide mechanism 47 allows the measurement with the driver 45 facing the external acoustic opening at any position.

Further, the drive motor 48 has a sensor that detects the amount of movement of the driver 45. As the sensor, for example, a motor encoder that detects the motor rotation angle can be used. Thereby, the position of the driver 45 in the housing 46 can be detected. In other words, the position of the driver 45 in the guide mechanism 47 is detected. Further, a swivel angle sensor 143 is provided between the housing 46 and the headphone band 43B. Thereby, the swivel angle of the housing 46 with respect to the headphone band 43B can be detected.

The direction of the driver 45 with respect to the microphone 2L or the external acoustic opening can be obtained based on the amount of movement of the driver 45 and the swivel angle. In other words, the incident angle of the measurement signal output from the driver 45 can be obtained. If the wearing angle of the headphones 43 changes according to the user's head shape or the like, the incident angles of the measurement signals can be aligned in the second pre-measurement and the user's measurement. Further, the incident angles of the measurement signals can be aligned in the second pre-measurement and the first pre-measurement. Specifically, the drive motor 48 moves the driver 45 to an appropriate position based on the swivel angle. This enables more appropriate matching.

Modified Example 2

Figure 23:
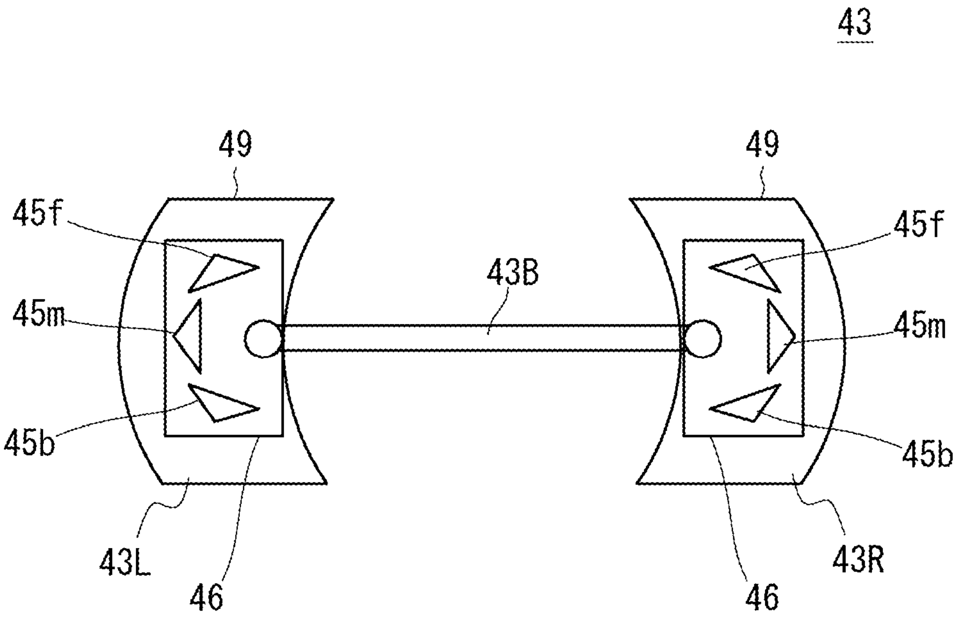
FIG. 23 is a top view schematically showing headphones of a modified example 2.
Figure 24:
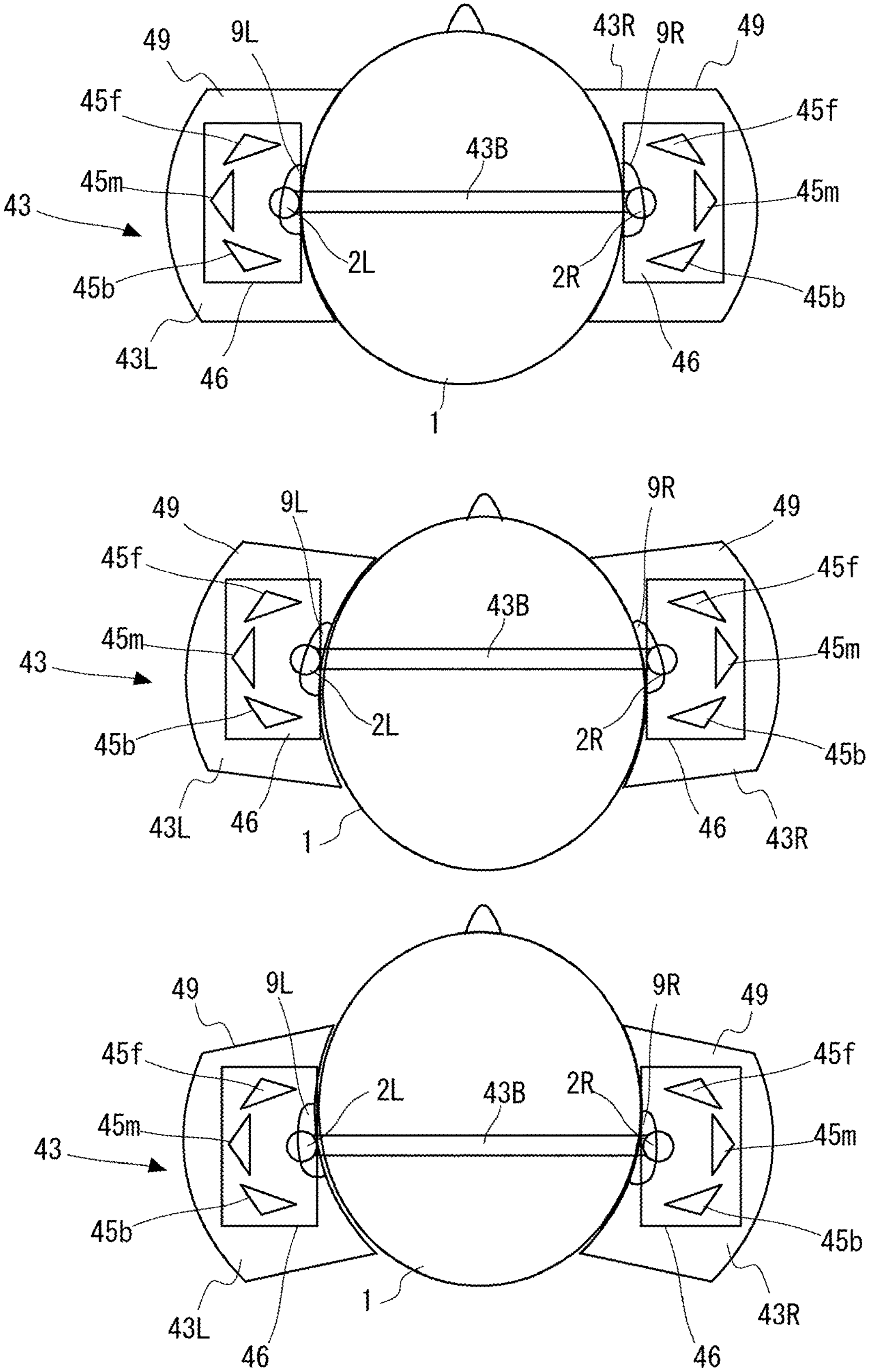
FIG. 24 is a diagram for explaining wearing states of headphones of the modified example 2.

The second modified example of the fourth embodiment is described with reference to FIGS. 23 and 24. FIG. 23 is a top view schematically showing the headphones 43 of the modified example 2. FIG. 24 is diagrams each showing a state where the headphones 43 are worn. Also in the modified example 2, since the left unit 43L and the right unit 43R have a symmetrical structure, the description of the right unit 43R is omitted as appropriate.

The left unit 43L includes a driver 45*f*, a driver 45*m*, a driver 45*b*, a housing 46, and an outer housing 49. In the modified example 2, three drivers 45*f*, 45*m* and 45*b* are housed in the housing 46. Of course, the number of drivers is not limited to three, but it is at least two. Further, an outer housing 49 is provided on the outside of the housing 46. In other words, the housing 46 is an inner housing housed inside the outer housing 49.

The driver 45*f*, the driver 45*m*, and the driver 45*b* are fixed to the housing 46. In the modified example 2, the positions of the driver 45*f*, the driver 45*m*, and the driver 45*b* with respect to the housing 46 are not variable. Further, the housing 46 is fixed to the headphone band 43B. In other words, the swivel angle of the housing 46 with respect to the headphone band 43B does not change.

The angle of the outer housing 49 with respect to the housing 46 is variable. For example, the housing 46 and the outer housing 49 are connected by a bellows-shaped boot (not shown). Further, the housing 46 and the outer housing 49 may be closed up with bellows-shaped boot.

As shown in FIG. 24, the angle of the outer housing 49 changes according to the head shape of the person 1 being measured. In FIG. 24, the positions of the left ear 9L and the right ear 9R are different in the front-rear direction. In the person 1 being measured whose left ear 9L and right ear 9R are standard positions, the left and right outer housings 49 face each other (as shown in the upper part of FIG. 24).

In the person 1 being measured whose left ear 9L and right ear 9R are on the rear side, the left and right outer housings 49 open rearward (as shown middle part of FIG. 24). In other words, the front ends of the left and right outer housings 49 are closer to each other, and the rear ends thereof are farther from each other.

In the person 1 being measured whose left ear 9L and right ear 9R are on the front side, the left and right outer housings 49 open forward (as shown in the lower part of FIG. 24). In other words, the rear ends of the left and right outer housings 49 are closer to each other, and the front ends are farther from each other.

Thus changing the angle of the outer housing 49 can improve the wearing state. For example, the left unit 43L and the right unit 43R can be brought into close contact with the person 1 being measured. The measurement can be performed without a gap between the person 1 being measured and the left unit 43L. Thereby, it is possible to prevent the headphones 43 from being displaced during measurement. Further, the outer housing 49 can close up the measurement space for performing the second pre-measurement or the user measurement, which is the space around the external acoustic opening, to improve the accuracy of the measurement.

The driver position in the housing 46 is fixed, and the swivel angle of the housing 46 is fixed. Therefore, the left and right housings 46 face each other regardless of the head shape of the person 1 being measured. This can prevent the change in the incident angle of the measurement signal. Thereby, the measurement can be performed at a specified incident angle, so that the measurement can be performed with higher accuracy.

Thus using the headphones 43 of the fourth embodiment or the modified example 2 thereof allows measuring the first and second ear canal transfer characteristics. A spatial acoustic filter corresponding to the spatial acoustic transfer characteristics from the sound source to the ear is generated based on the first ear canal transfer characteristics. The inverse filter, which cancels the characteristic of the headphones, is generated based on the second ear canal transfer characteristics. This can improve the accuracy of out-of-head localization processing.

(Example of Placing Driver 45*f*)

An example of placing the driver 45*f* is described with reference to FIGS. 5 and 25. The driver 45*f* and the stereo speaker 5 are symmetrically placed, so the placement of the left speaker 5L and the driver 45*f* of the left unit 43L is described hereinafter.

In FIG. 5, the direction from the head center O to the left speaker 5L is parallel to the direction from the microphone 2L to the driver 45*f*. In general, the stereo speaker 5 is preferably placed so that the head center C, the left speaker 5L, and the right speaker 5R forms an equilateral triangular. Therefore, the opening angle θ from the head center O to the left speaker 5L or the right speaker 5R is set to 30°.

When the sound wave is approximated to a plane sound wave in assuming how the wavefront of sound wave propagates, the wavefront, which is perpendicular to the straight line connecting the left speaker 5L and the head center O, propagates. Because the sound wave is a plane wave, the line from left speaker 5L to the head center O is parallel to the line from the left speaker 5L to the left ear 9L as well as the line from the driver 45*f* to the left ear 9L. Therefore, it is preferable to place the driver 45*f* as shown in FIG. 5.

Figure 25:
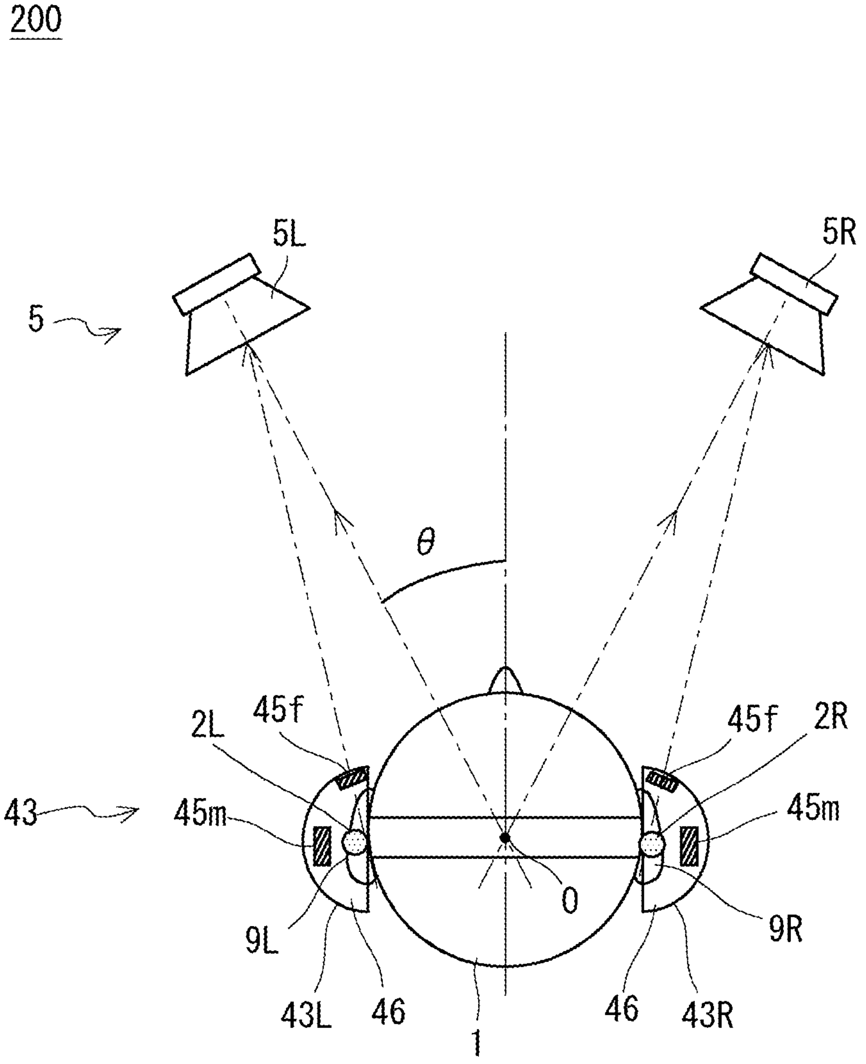
FIG. 25 is a diagram for explaining the placement of a speaker and a driver.

On the other hand, assuming that this sound wave is a spherical sound wave, it is preferable to place the stereo speaker 5 and the driver 45*f* as shown in FIG. 25. In FIG. 25, the driver 45*f* is placed on a straight line from the microphone 2L to the speaker 5L. Of course, the speaker 5L may be placed toward the left ear 9L. The placement from the microphone 2L to the speaker 5L is not limited to the placements shown in FIGS. 5 and 25. The direction from the left microphone 2L to the driver 45*f* may be any direction along the direction from the person 1 being measured to the speaker 5L, which is a sound source. Here, the position of the person 1 being measured may be the position of the head center O, or may be the position of the left microphone 2L.

The above first to fourth embodiments and their modified examples can be combined as appropriate. Further, the measurement order of the first to third ear canal transfer characteristics is not particularly limited. For example, the second ear canal transfer characteristics may be measured first.

A part or the whole of the above-described processing may be executed by a computer program. The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). Alternatively, the program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Although embodiments of the invention made by the present inventor are described in the foregoing, the present invention is not restricted to the above-described embodiments, and various changes and modifications may be made without departing from the scope of the invention.

The present disclosure is applicable to out-of-head localization.

What is claimed is:

1. An out-of-head localization filter determination system, comprising:
- an output unit configured to be worn on a user and output sounds to an ear of the user;
- a microphone unit, including a microphone, configured to be worn on the ear of the user, the microphone picking up sounds output from the output unit;
- a measurement processor configured to output a measurement signal to the output unit and acquire a sound pickup signal output from the microphone unit, and thereby measure ear canal transfer characteristics; and
- a server device configured to be able to communicate with the measurement processor, wherein
- the measurement processor:
  - measures first car canal transfer characteristics from a first position to the microphone with a driver of the output unit being at the first position;
  - measures a second ear canal transfer characteristics from a second position, different from the first position, to the microphone; and
  - transmits user data related to the first and second ear canal transfer characteristics to the server device, and the server device includes:

a data storage unit configured to store first preset data related to spatial acoustic transfer characteristics from a sound source to an ear of a person being measured and second preset data related to ear canal transfer characteristics of the ear of the person being measured in association with each other, and store a plurality of the first and second preset data acquired for a plurality of persons being measured;

a comparison unit configured to compare the user data with the plurality of second preset data; and an extraction unit configured to extract first preset data from the plurality of first preset data based on a comparison result in the comparison unit.

2. The out-of-head localization filter determination system according to claim 1, wherein a spatial acoustic filter according to spatial acoustic transfer characteristics from a sound source to an ear is generated based on the extracted first preset data, and an inverse filter configured to cancel characteristics of the output unit is generated based on the second ear canal transfer characteristics.

3. An out-of-head localization filter determination method for determining an out-of-head localization filter for the user by using:

an output unit configured to be worn on a user and output sounds to an ear of the user; and a microphone unit, including a microphone, configured to be worn on the ear of the user, the microphone picking up sounds output from the output unit, the out-of-head localization filter determination method comprising:

a step of measuring first ear canal transfer characteristics from a first position to the microphone and second ear canal transfer characteristics from a second position to the microphone;

a step of acquiring user data based on measurement data related to the first and second ear canal transfer characteristics;

a step of storing a plurality of first and second preset data acquired for a plurality of persons being measured, in such a way that associates the first preset data related to spatial acoustic transfer characteristics from a sound source to ears of persons being measured and the second preset data related to ear canal transfer characteristics of the cars of the persons being measured; and a step of comparing the user data with the plurality of second preset data and thereby extracting first preset data from the plurality of first preset data.

4. The out-of-head localization filter determination method according to claim 3, wherein a spatial acoustic filter according to spatial acoustic transfer characteristics from a sound source to an ear is generated based on the extracted first preset data, and an inverse filter configured to cancel characteristics of the output unit is generated based on the second ear canal transfer characteristics.

* * * * *